(12) United States Patent
Murata et al.

(10) Patent No.: US 11,407,032 B2
(45) Date of Patent: *Aug. 9, 2022

(54) THREE-DIMENSIONAL SHAPING APPARATUS

(71) Applicant: HODEN SEIMITSU KAKO KENKYUSHO CO., LTD., Atsugi (JP)

(72) Inventors: Chikara Murata, Zama (JP); Atsumori Inada, Atsugi (JP)

(73) Assignee: HODEN SEIMITSU KAKO KENKYUSHO CO., LTD., Atsugi (JP)

(*) Notice: Subject to any disclaimer, the term of this patent is extended or adjusted under 35 U.S.C. 154(b) by 295 days.

This patent is subject to a terminal disclaimer.

(21) Appl. No.: 15/318,729

(22) PCT Filed: Jun. 5, 2015

(86) PCT No.: PCT/JP2015/066353
§ 371 (c)(1),
(2) Date: Dec. 14, 2016

(87) PCT Pub. No.: WO2015/194399
PCT Pub. Date: Dec. 23, 2015

(65) Prior Publication Data
US 2017/0129010 A1 May 11, 2017

(30) Foreign Application Priority Data
Jun. 18, 2014 (JP) .............................. JP2014-125078

(51) Int. Cl.
*B33Y 10/00* (2015.01)
*B33Y 30/00* (2015.01)
(Continued)

(52) U.S. Cl.
CPC .............. *B22F 10/20* (2021.01); *B22F 3/105* (2013.01); *B22F 3/16* (2013.01); *B29C 64/176* (2017.08);
(Continued)

(58) Field of Classification Search
CPC ........... B22F 3/1055; B22F 2003/1056; B29C 64/245
See application file for complete search history.

(56) References Cited

U.S. PATENT DOCUMENTS 2,628,493 A * 2/1953 Sandefur ............. G01F 25/0061
73/305
3,578,278 A * 5/1971 Pickering ............ F16F 15/0275
248/550

(Continued)

FOREIGN PATENT DOCUMENTS

CN 203031962 U 7/2013
CN 103802322 A 5/2014
(Continued)

OTHER PUBLICATIONS https://reprap.org/forum/read.php?1,150849,246984#msg-246984 (Year: 2012).*

(Continued)

*Primary Examiner* — Nicholas R Krasnow
(74) *Attorney, Agent, or Firm* — Sughrue Mion, PLLC

(57) ABSTRACT

A three-dimensional shaping apparatus 1 includes a support frame 11, a material supply part 3 supported by the support frame 11, a shaped article placing part 4 which is supported by the support frame 11 and on which a material supplied from the material supply part 3 is placed, an input part 51 that previously inputs thereto the moving amount of a table 41, a storage part 52 that stores the moving amount input thereto from the input part 51, and a controller 50 that (Continued)

controls the material supply part 3 and the shaped article placing part 4. The shaped article placing part 4 includes a table 41 on the upper surface of which a shaped article is placed and a drive part 45 that drives the table 41. The controller 50 moves the table 41 by the moving amount stored in the storage part 52.

4 Claims, 21 Drawing Sheets

(51) Int. Cl.

| | | |
|---|---|---|
| *B33Y 40/00* | (2020.01) | |
| *B33Y 40/10* | (2020.01) | |
| *B33Y 40/20* | (2020.01) | |
| *B33Y 50/00* | (2015.01) | |
| *B33Y 70/00* | (2020.01) | |
| *B33Y 80/00* | (2015.01) | |
| *B33Y 99/00* | (2015.01) | |
| *B29C 64/00* | (2017.01) | |
| *B29C 64/10* | (2017.01) | |
| *B29C 64/176* | (2017.01) | |
| *B29C 64/182* | (2017.01) | |
| *B29C 64/20* | (2017.01) | |
| *B29C 64/205* | (2017.01) | |
| *B29C 64/227* | (2017.01) | |
| *B29C 64/245* | (2017.01) | |
| *B29C 64/25* | (2017.01) | |
| *B29C 64/255* | (2017.01) | |
| *B29C 64/30* | (2017.01) | |
| *B29C 64/307* | (2017.01) | |
| *B29C 64/40* | (2017.01) | |
| *B22F 10/20* | (2021.01) | |
| *B29C 64/241* | (2017.01) | |
| *B22F 3/16* | (2006.01) | |
| *B29C 67/00* | (2017.01) | |
| *B22F 3/105* | (2006.01) | |
| *B33Y 50/02* | (2015.01) | |
| *B29C 64/153* | (2017.01) | |
| *B29C 64/147* | (2017.01) | |
| *B29C 64/141* | (2017.01) | |
| *B22F 10/30* | (2021.01) | |

(52) U.S. Cl.
CPC ............ *B29C 64/182* (2017.08); *B29C 64/20* (2017.08); *B29C 64/205* (2017.08); *B29C 64/227* (2017.08); *B29C 64/241* (2017.08); *B29C 64/245* (2017.08); *B29C 64/25* (2017.08); *B29C 64/255* (2017.08); *B29C 64/30* (2017.08); *B29C 64/307* (2017.08); *B29C 64/40* (2017.08); *B29C 67/00* (2013.01); *B33Y 10/00* (2014.12); *B33Y 30/00* (2014.12); *B33Y 40/00* (2014.12); *B33Y 40/10* (2020.01); *B33Y 40/20* (2020.01); *B33Y 50/00* (2014.12); *B33Y 50/02* (2014.12); *B33Y 70/00* (2014.12); *B33Y 80/00* (2014.12); *B33Y 99/00* (2014.12); *B22F 10/30* (2021.01); *B29C 64/00* (2017.08); *B29C 64/10* (2017.08); *B29C 64/141* (2017.08); *B29C 64/147* (2017.08); *B29C 64/153* (2017.08); *Y02P 10/25* (2015.11)

(56) References Cited

U.S. PATENT DOCUMENTS

| | | | | |
|---|---|---|---|---|
| 4,182,506 | A * | 1/1980 | Boveia | B23Q 1/545 248/651 |
| 5,546,784 | A * | 8/1996 | Haas | B21D 37/02 72/413 |
| 2003/0185592 | A1* | 10/2003 | Ohara | G02B 7/023 399/167 |
| 2007/0003656 | A1* | 1/2007 | LaBossiere | B29C 48/2528 425/375 |
| 2007/0127967 | A1* | 6/2007 | Sasao | B41J 19/30 400/323 |
| 2010/0090374 | A1 | 4/2010 | Dietrich et al. | |
| 2010/0100222 | A1 | 4/2010 | Skubic et al. | |
| 2011/0285060 | A1 | 11/2011 | Yamamoto et al. | |
| 2012/0291701 | A1 | 11/2012 | Grasegger et al. | |
| 2013/0316081 | A1 | 11/2013 | Kovalcik et al. | |
| 2014/0048971 | A1 | 2/2014 | Mannella et al. | |
| 2015/0273768 | A1* | 10/2015 | Wyatt | B29C 64/393 700/119 |
| 2015/0276119 | A1* | 10/2015 | Booker | B29C 64/106 248/561 |
| 2015/0321419 | A1* | 11/2015 | Linthicum | B29C 48/397 264/308 |
| 2017/0120522 | A1* | 5/2017 | Skubic | B29C 48/02 |

FOREIGN PATENT DOCUMENTS

| | | | |
|---|---|---|---|
| DE | 10 2012 014840 A1 | 1/2014 | |
| JP | 05-318607 A | 12/1993 | |
| JP | 2000-127252 A | 5/2000 | |
| JP | 2005-297325 A | 10/2005 | |
| JP | 2006-511710 A | 4/2006 | |
| JP | 2006-240045 A | 9/2006 | |
| JP | 2011-127195 A | 6/2011 | |
| JP | 2011-241450 A | 12/2011 | |
| JP | 2014-104683 A | 6/2014 | |
| WO | 2004/056511 A1 | 7/2004 | |
| WO | 2010/045382 A1 | 4/2010 | |

OTHER PUBLICATIONS http://hydraraptor.blogspot.com/2011/04/auto-z-probe.html (Year: 2011).*
Wiredl (NPL 2012) archive.is/djXlx#selection-2340.1-2423.60 (Year: 2012).*
Extended European Search Report dated Dec. 7, 2017 issued by the European Patent Office in counterpart application No. 15810374.7.
Notification of Reasons for Refusal dated Jun. 27, 2018, from the Japanese Patent Office in counterpart Application No. 2014-125078.
First Notice of Rejection dated May 21, 2018, from the State Intellectual Property Office of People's Republic of China in counterpart Application No. 201580032504.4.
International Search Report of PCT/JP2015/066353 dated Jul. 7, 2015 [PCT/ISA/210].

* cited by examiner

THREE-DIMENSIONAL SHAPING APPARATUS

CROSS REFERENCE TO RELATED APPLICATIONS

This application is a National Stage of International Application No. PCT/JP2015/066353, filed Jun. 5, 2015, claiming priority based on Japanese Patent Application No. 2014-125078, filed Jun. 18, 2014, the contents of all of which are incorporated herein by reference in their entirety.

TECHNICAL FIELD

The present invention relates to a three-dimensional shaping apparatus that produces a three-dimensional shaped article by repeatedly forming powder into a layer.

BACKGROUND ART

There is disclosed a three-dimensional shaping apparatus that repeatedly performs a sintering operation including irradiation of a metal powder layer with a focused energy beam to produce a three-dimensional shaped article composed of a plurality of sintered bodies (see Patent Documents 1 and 2).

CITATION LIST

Patent Document

Patent Document 1: JP 2011-127195A
Patent Document 2: JP-T 2006-511710

DISCLOSURE OF THE INVENTION

Problems to be Solved by the Invention

An object of the present invention is to provide a three-dimensional shaping apparatus excellent in accuracy and productivity.

A three-dimensional shaping apparatus according to an embodiment of the present invention includes: a support frame; a material supply part supported by the support frame; a shaped article placing part which is supported by the support frame and on which a material supplied from the material supply part is placed; an input part that previously inputs thereto the moving amount of a table; a storage part that stores the moving amount input thereto from the input part; and a controller that controls the material supply part and the shaped article placing part. The shaped article placing part includes: a table on the upper surface of which the shaped article is placed; and a drive part that drives the table. The controller moves the table by the moving amount stored in the storage part.

In the three-dimensional shaping apparatus according to the embodiment of the present invention, state signals of the drive part is fed back to the controller.

In the three-dimensional shaping apparatus according to the embodiment of the present invention, the drive part includes first and second drive parts which can be independently driven, and the controller independently controls the first and second drive parts.

In the three-dimensional shaping apparatus according to the embodiment of the present invention, the shaped article placing part further includes a transmission part having first and second transmission parts that transmit drive forces supplied from the respective first and second drive parts to the table.

In the three-dimensional shaping apparatus according to the embodiment of the present invention, the drive part includes the first to fourth drive parts arranged in a rectangular shape, and the controller can independently control the first to fourth drive parts.

The three-dimensional shaping apparatus according to the embodiment of the present invention includes; a rod moved together with the table; and a limit switch put in contact with the rod when the rod reaches a predetermined position.

Advantages of the Invention

According to the present invention, there can be provided a three-dimensional shaping apparatus excellent in accuracy and productivity.

BEST MODE FOR CARRYING OUT THE INVENTION

Figure 1:
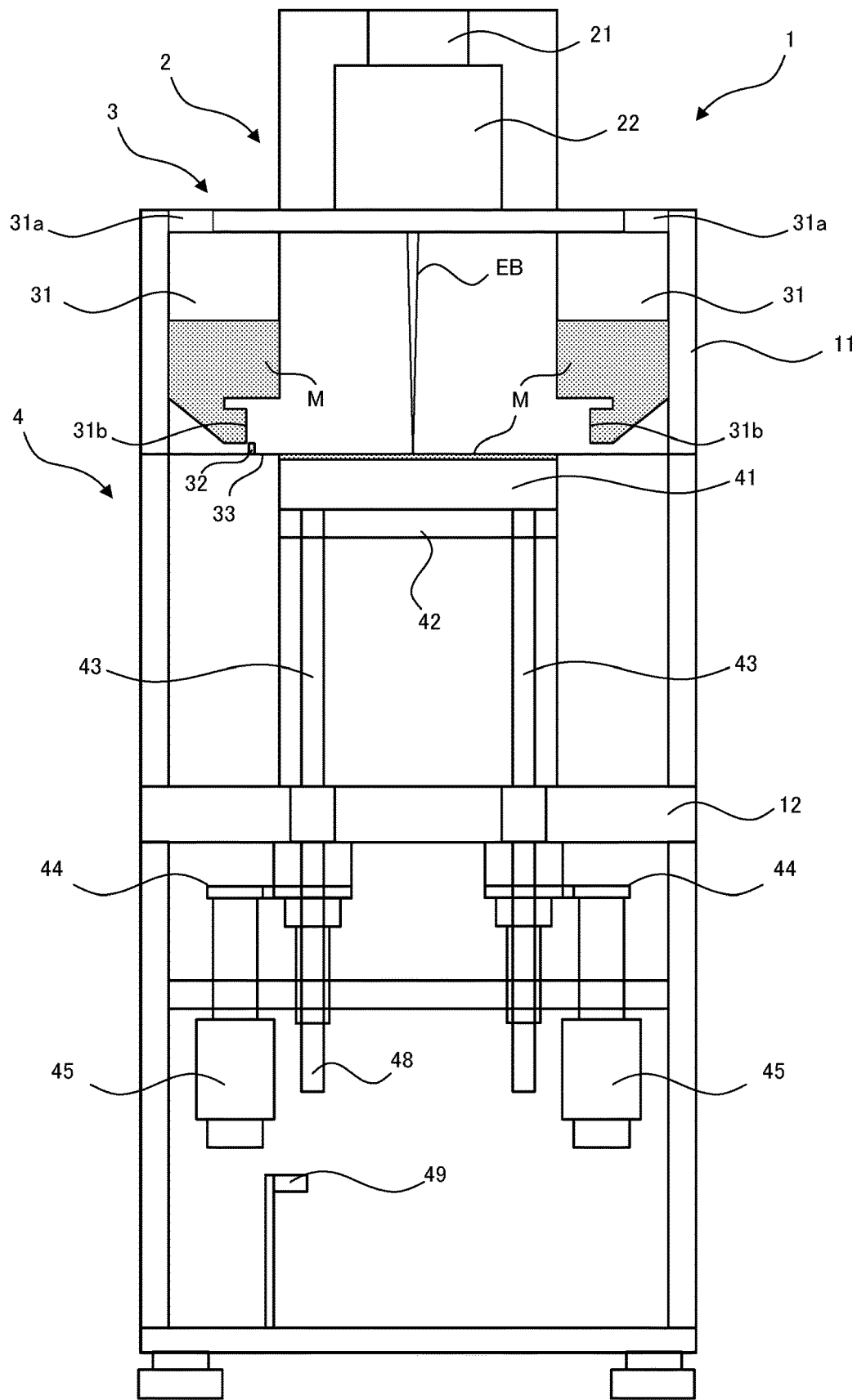
FIG. 1 is a view illustrating a three-dimensional shaping apparatus according to an embodiment of the present invention.

FIG. 1 is a view illustrating a three-dimensional shaping apparatus according to an embodiment of the present invention.

A three-dimensional shaping apparatus 1 according to the present embodiment includes an energy beam irradiation part 2 as a material supply part, a powder supply part 3 as a material supply part, and a shaped article placing part 4. The energy beam irradiation part 2, powder supply part 3, and shaped article placing part 4 are supported by a support frame 11. A reference frame 12 as a part of the support frame 11 is formed at the intermediate portion of the support frame 11.

The energy beam irradiation part 2 includes a beam generation part 21 that generates an energy beam EB and a beam scanning part 22 that adjusts the focal position of the energy beam EB emitted from the beam generation part 21 and performs two-dimensional scanning. The energy beam irradiation part 2 is placed on the support frame 11. Although the beam scanning part 22 is configured to perform the two-dimensional scanning in the present embodiment, it may be configured to perform three-dimensional scanning in which the beam focal position can also be adjusted in a vertical direction.

The beam generation part 21 is preferably configured to generate a laser light, an electron beam, or the like. When the energy beam EB is a light beam, the beam scanning part 22 moves an optical element such as a lens to converge the light beam on a metal powder M on a table to be described later and two-dimensionally scans a table 41. In this case, for example, the energy beam irradiation part 2 may have a configuration like the laser irradiation unit described in Patent Document 1. When the energy beam is an electron beam, the beam scanning part 22 focuses the electron beam under magnetic field control and two-dimensionally scans the table 41. In this case, for example, the energy beam irradiation part 2 may have a configuration like the device that emits and guides an electron beam which is disclosed in Patent Document 2.

The powder supply part 3 includes a powder storage part 31 that temporarily store the metal powder M, a leveling part 32 that levels the metal powder M on the table, and an outer frame part 33.

The powder storage part 31 is a container retained by the support frame 11. The powder storage part 31 has an injection part 31a for injecting the metal powder M and a discharge part 31b for discharging the metal powder M at the upper and lower portions thereof, respectively. The discharge part 31b is preferably configured to adjust the discharge amount of the metal powder M.

The leveling part 32 is a part that moves a member like a scraper on the table 41 to level the metal powder M discharged from the powder storage part 31 to thereby form a plane having as much a uniform height as possible. The height of the leveled metal powder M can preferably be adjusted.

The outer frame part 33 is supported by the support frame 11 and installed on the outer periphery of the table 41 to be described later. To the outer frame part 33, extra metal powder M is pushed out as a result of the leveling operation of the leveling part 32. The extra metal powder M is preferably circulated to the powder storage part 31 by an unillustrated circulation part.

As described above, the unillustrated circulation part that returns, to the powder storage part 31, the metal powder M that has not been subjected to shaping after being discharged onto the table 41 from the discharge part 31b may be formed in the powder supply part 3.

The material supply part is not limited to the energy beam irradiation part 2 and the powder supply part 3 of the present embodiment but may have a configuration in which sheet-like or tape-like resins, pieces of paper, or metals are bonded, a configuration in which liquid is cured, a configuration in which an inkjet head is used to eject a solid or liquid for bonding, a configuration in which a filament is deposited and welded, or a configuration in which metal powder is welded.

Figure 2:
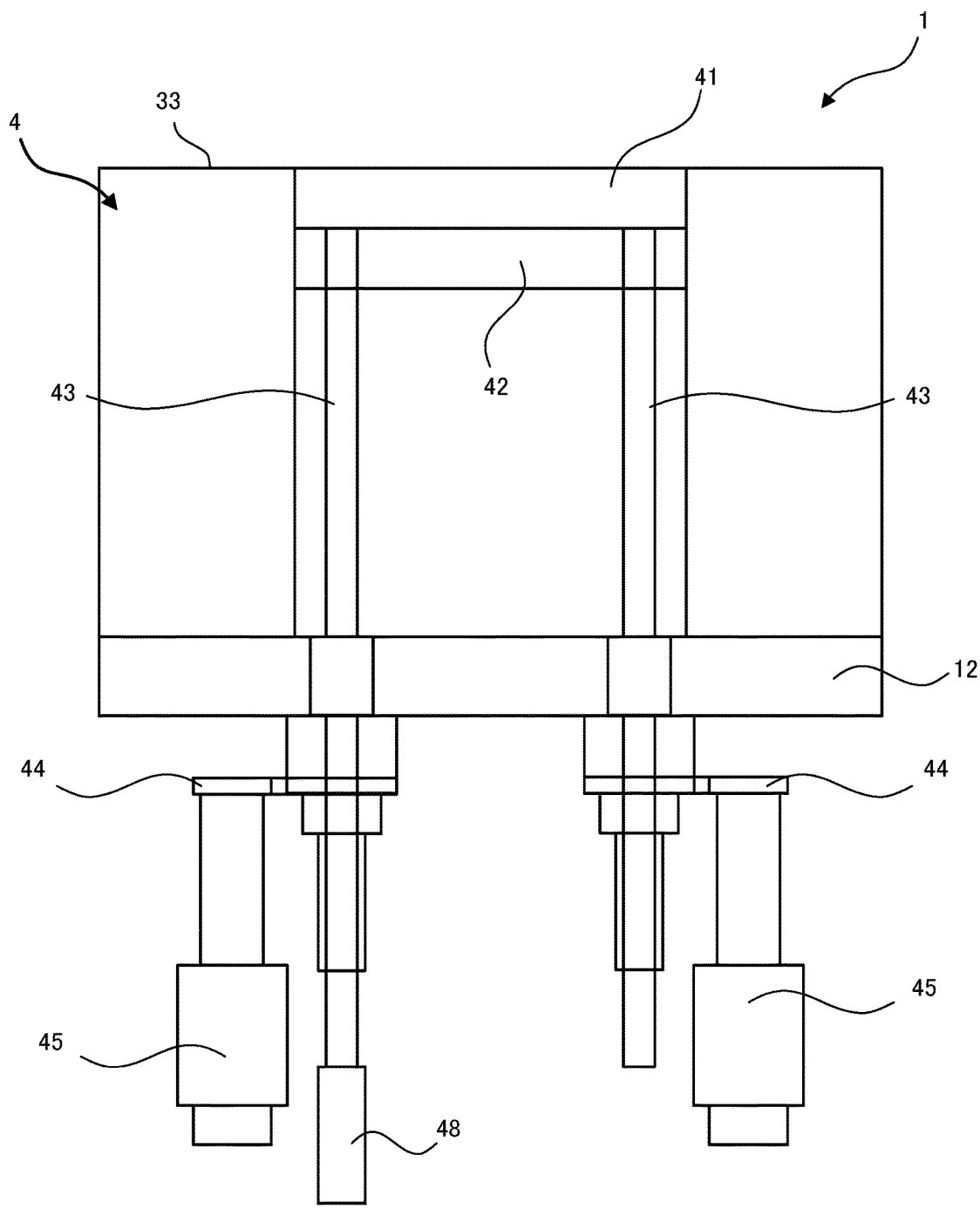
FIG. 2 is an enlarged view illustrating a shaped article placing part of the three-dimensional shaping apparatus according to the present embodiment.
Figure 3:
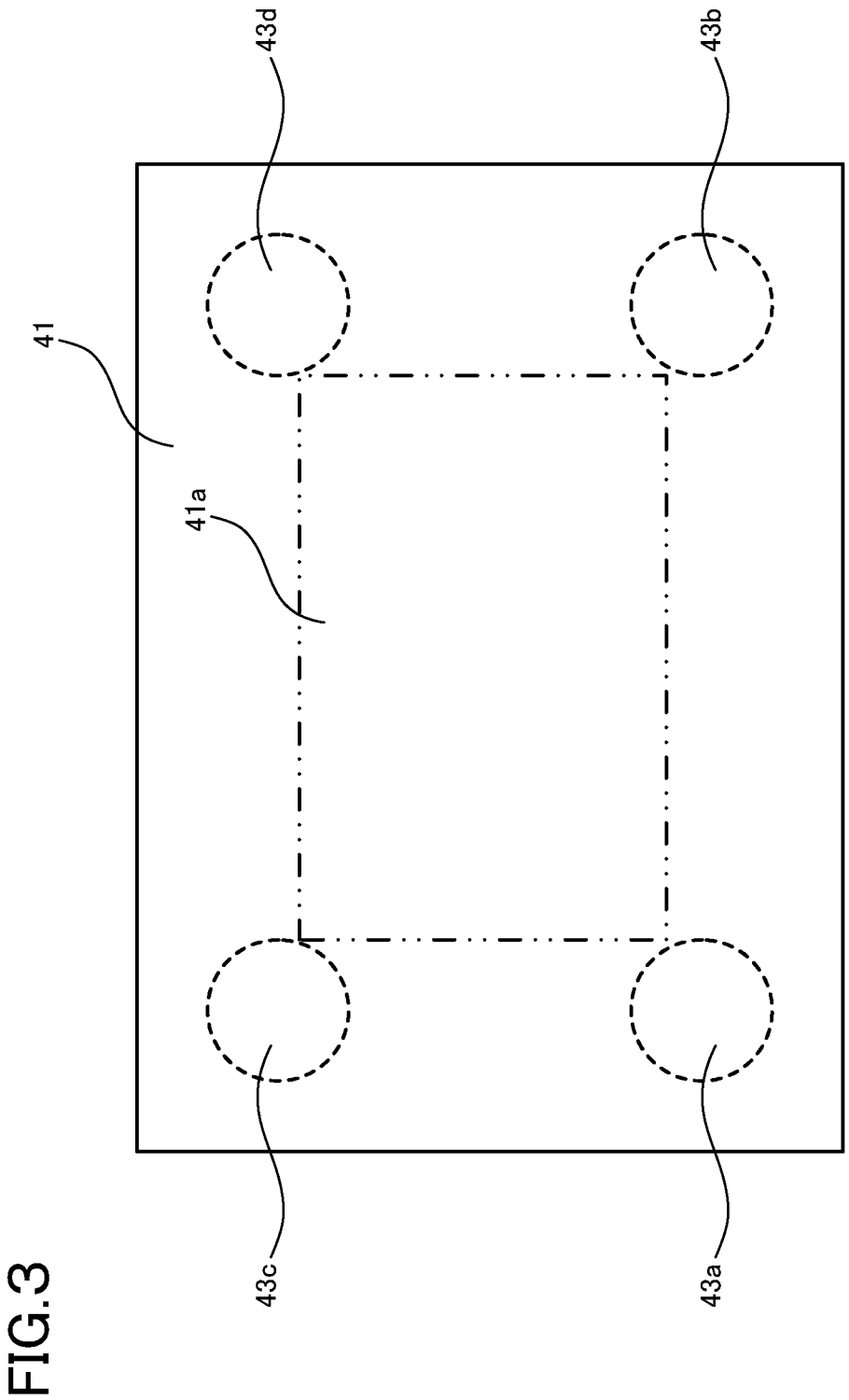
FIG. 3 is a schematic view illustrating an arrangement in a drive transmission part of the three-dimensional shaping apparatus according to the present embodiment.
Figure 4:
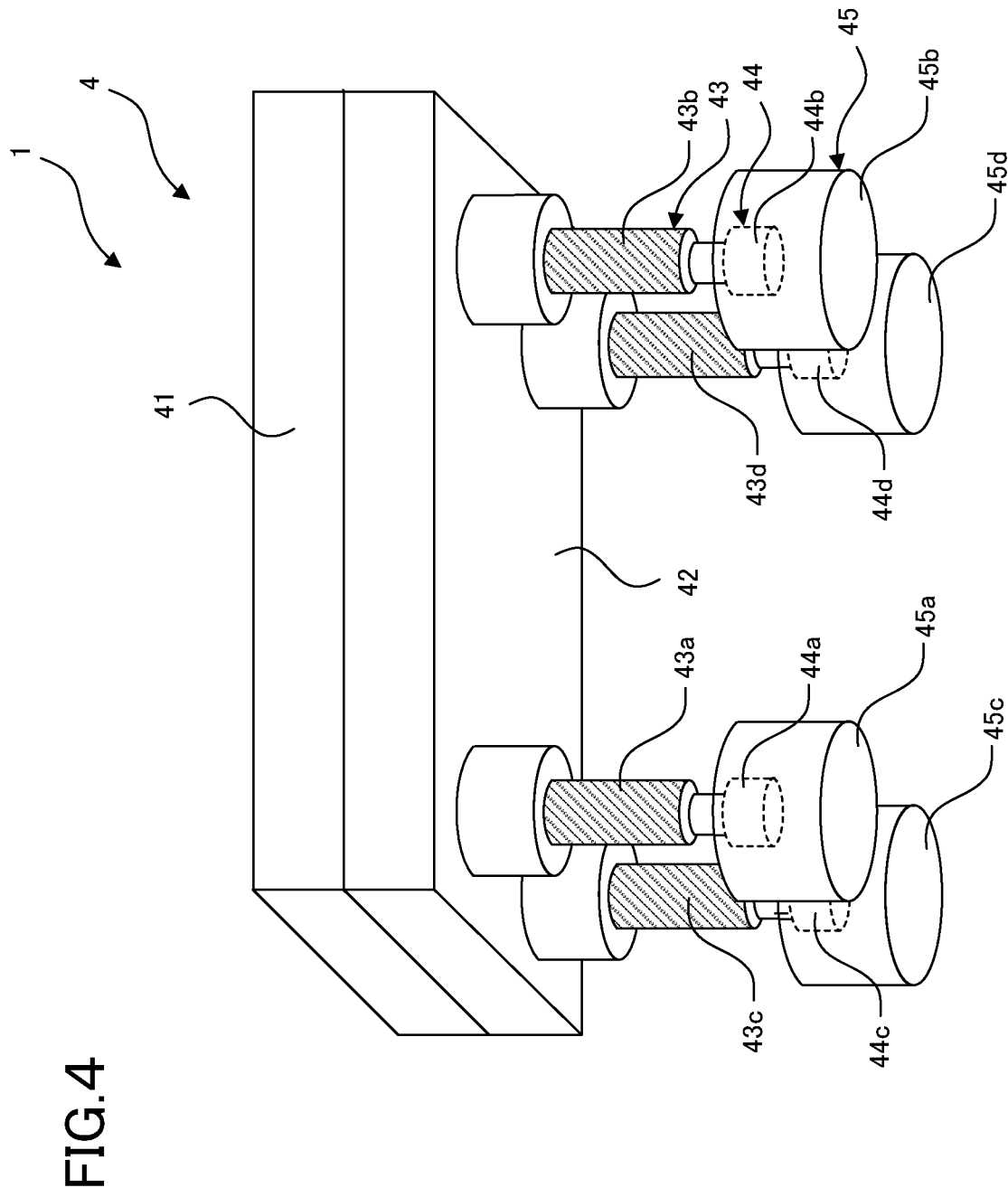
FIG. 4 is a schematic perspective view illustrating the shaped article placing part of the three-dimensional shaping apparatus according to the present embodiment.

FIG. 2 is an enlarged view illustrating the shaped article placing part of the three-dimensional shaping apparatus according to the present embodiment. FIG. 3 is a schematic view illustrating an arrangement in a drive transmission part of the three-dimensional shaping apparatus according to the present embodiment. FIG. 4 is a schematic perspective view illustrating the shaped article placing part of the three-dimensional shaping apparatus according to the present embodiment.

The shaped article placing part 4 includes a table 41, a slider 42, a ball screw 43, a deceleration part 44, a table drive part 45, a rod 48, and a limit switch 49.

The table 41 is supported by the slider 42. The upper surface of the table 41 is a flat surface, onto which the metal powder M illustrated in FIG. 1 is discharged and placed. A shaped article is preferably formed in a shaping area 41a having a smaller size than the external size of the table 41.

The slider 42 supports the table 41 at its upper surface. The slider 42 is supported at its lower portion by the ball screw 43. The ball screw 43 is connected to a drive part 45 through the deceleration part 44. The drive part 45 includes a servo motor or other actuator. The drive of the drive part 45 rotates the ball screw 43 to move the slider 42 in the vertical direction, thereby vertically moving the table 41. The ball screw 43 is preferably configured to penetrate the reference frame 12.

More specifically, in the present embodiment, four ball screws 43, four deceleration parts 44, and four drive parts 45 are provided. The ball screw 43 and deceleration part 44 constitute a transmission part. Further, the drive part 45 and transmission part constitute a drive transmission part. In place of using the deceleration part 44, a direct action mechanism constituted of the drive part 45 and the ball screw 43 may be adopted. The direct action mechanism can suppress backlash, enabling more highly accurate control.

As illustrated in FIG. 3, a first ball screw 43a, a second ball screw 43b, a third ball screw 43c, and a fourth ball screw 43d are connected to the slider 42 at the outside of the shaping area 41a so as to correspond to four corners of the slider 42.

As illustrated in FIG. 4, a first drive part 45a, a second driver part 45b, a third drive part 45c, and a fourth drive part 45d are connected respectively to the first ball screw 43a, second ball screw 43b, third ball screw 43c, and fourth ball screw 43d through a first deceleration part 44a, a second deceleration part 44b, a third deceleration part 44c, and a fourth deceleration part 44d, respectively.

At least one of the first to fourth ball screws 43a to 43d is attached with the rod 48. The rod 48 is moved together with the table 41, slider 42, and ball screw 43. The limit switch 49 is provided below the rod 48. Thus, when the table 41, slider 42, ball screw 43, and rod 48 are excessively moved upward or downward, the limit switch 49 is activated to inform an operator of danger.

The following describes a control system of the three-dimensional shaping apparatus 1 according to the present embodiment.

Figure 5:
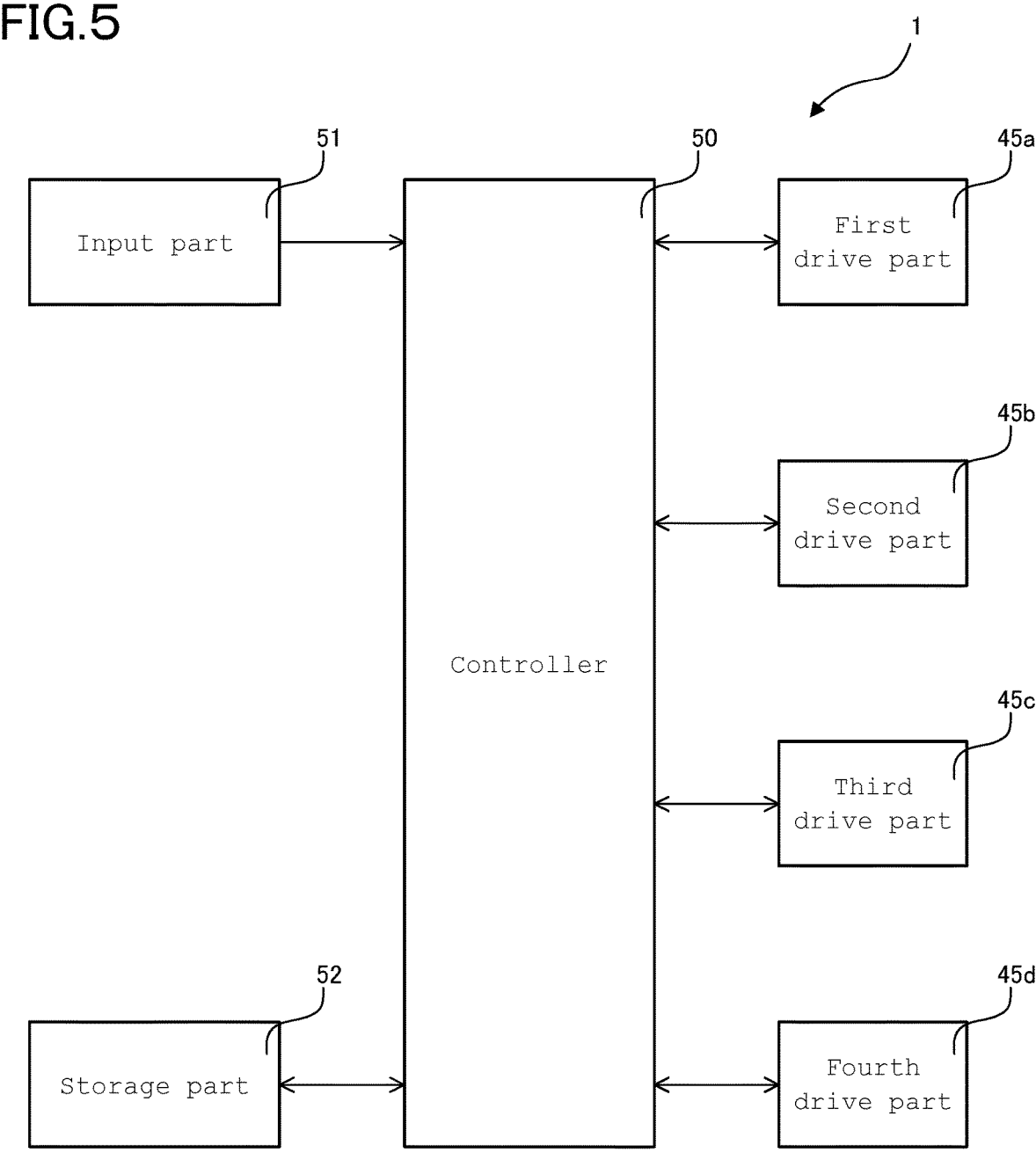
FIG. 5 is a view illustrating a control system of the three-dimensional shaping apparatus 1 according to the present embodiment.

FIG. 5 is a view illustrating a control system of the three-dimensional shaping apparatus 1 according to the present embodiment.

As illustrated in FIG. 5, in the three-dimensional shaping apparatus 1 according to the present embodiment, a controller 50 independently controls the first to fourth drive parts 45a to 45d on the basis of signals input respectively from an input part 51 and a storage part 52.

The input part 51 previously inputs information such as a forming shape, a forming pressure, and a forming speed. The storage part 52 stores therein the information input from the input part 51 and a shaping process and outputs them to the controller 50.

For example, a motor rotation angle is previously converted into a stroke amount and the stroke amount is stored in the storage part 52 so as to perform open control so that all axes are parallel. In addition to the open control, feedback control may be performed by converting the motor rotation angle into the stroke amount using an unillustrated motor encoder as the input part 51 and inputting the stroke amount to the controller 50.

The first to fourth drive parts 45a to 45d preferably feed back a current signal, a rotation speed signal, a torque signal, and the like to the controller 50.

The following describes the operation of the three-dimensional shaping apparatus 1 according to the present embodiment.

FIGS. 6 to 9 are enlarged views each illustrating an operation of the shaped article placing part of the three-dimensional shaping apparatus according to the present embodiment.

Figure 6:
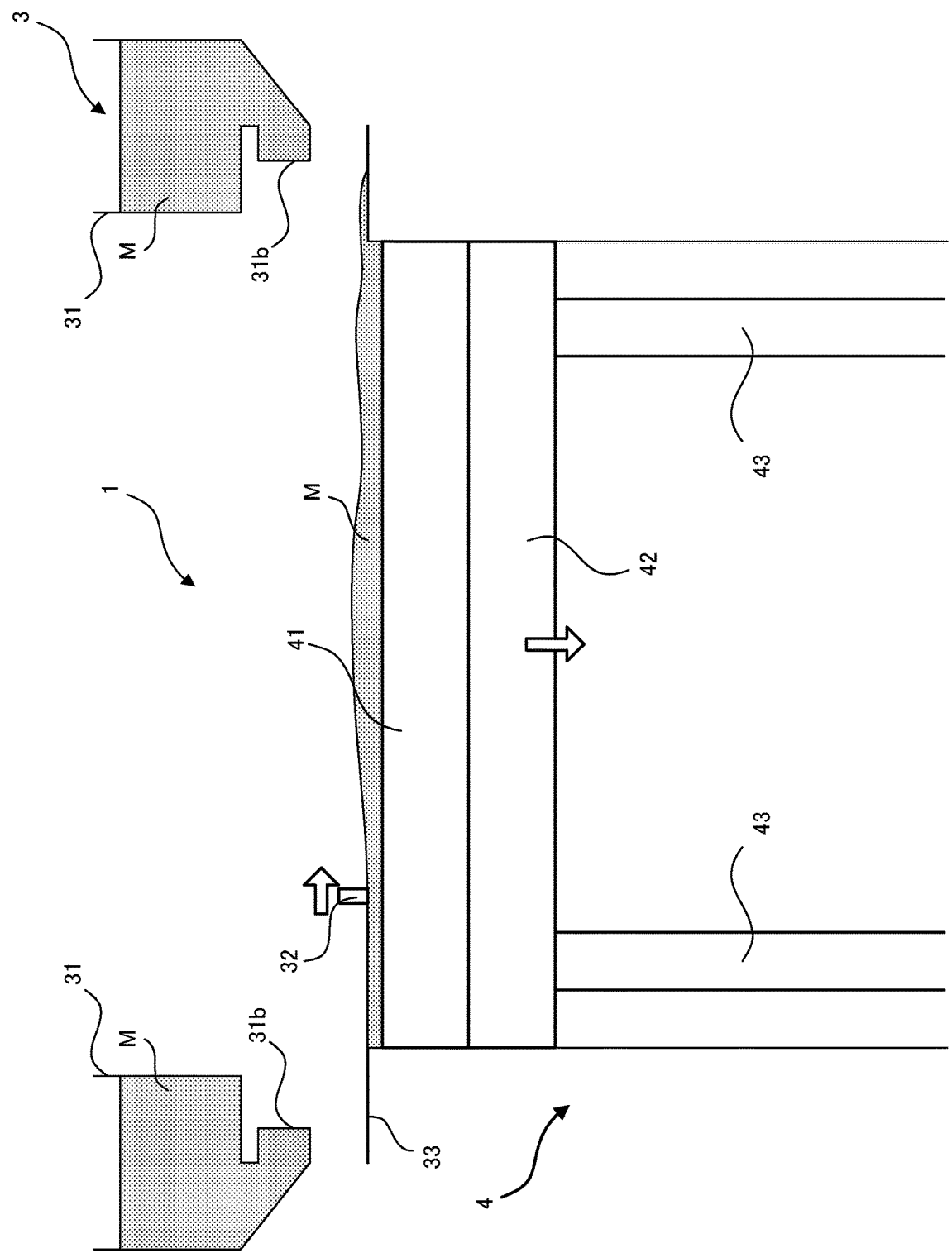
FIG. 6 is an enlarged view illustrating an operation of the shaped article placing part of the three-dimensional shaping apparatus according to the present embodiment.

First, in the three-dimensional shaping apparatus 1 according to the present embodiment, the drive part 45 illustrated in FIG. 4 is driven to move downward the table 41 as illustrated in FIG. 6. The moving amount of the table 41 is previously input to the input part 51 illustrated in FIG. 5 and then stored in the storage part 52.

In the three-dimensional shaping apparatus 1 according to the present embodiment, while the table 41 is moved by the moving amount stored in the storage part 52, the current, rotation speed, and torque signals of the respective first to fourth drive parts 45a to 45d are input to the controller 50.

The controller 50 independently controls the first to fourth drive parts 45a to 45d on the basis of the above signals to thereby control the table 41 to a predetermined posture. In the present embodiment, the table 41 is made horizontal.

Figure 7:
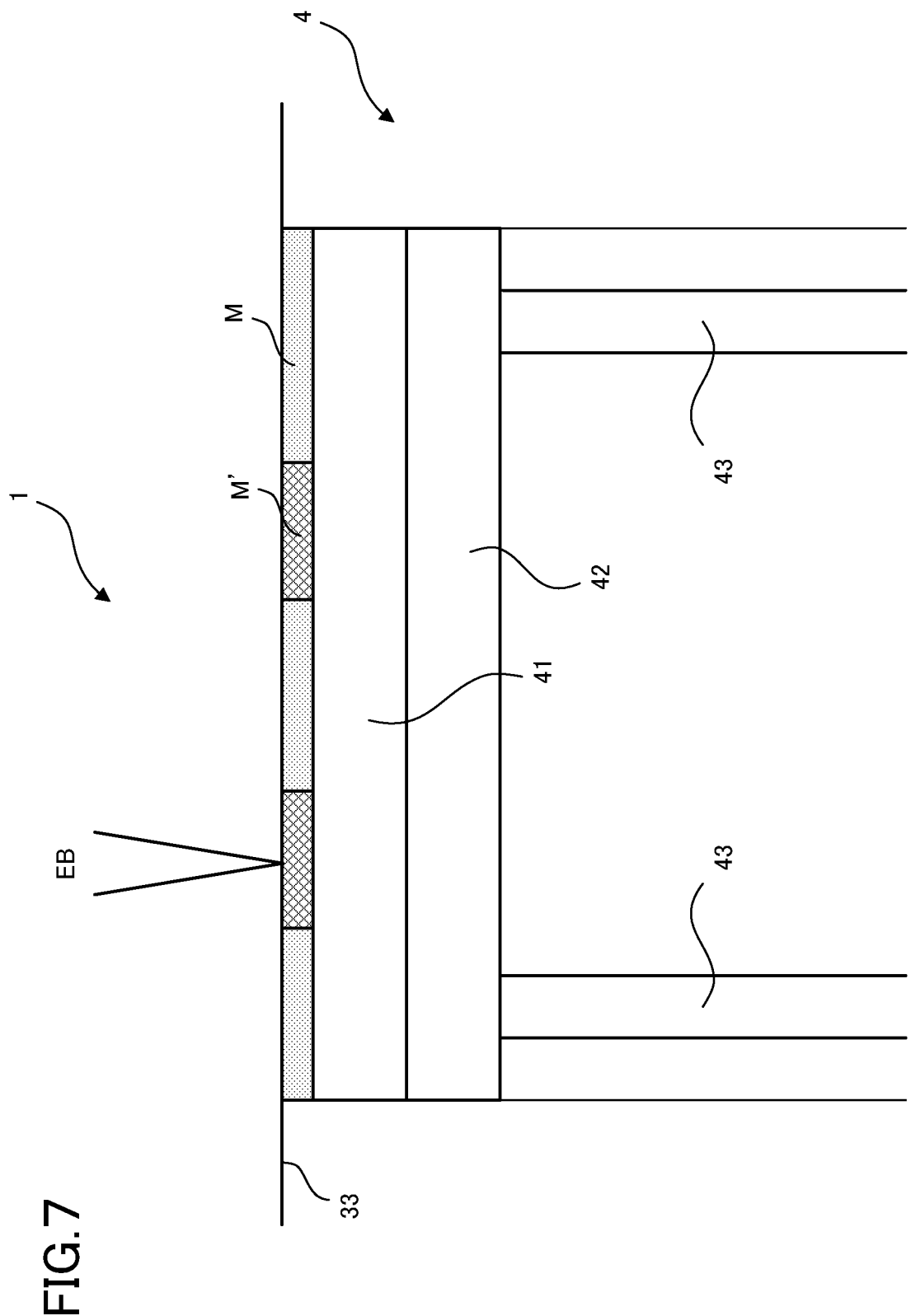
FIG. 7 is an enlarged view illustrating an operation of the shaped article placing part of the three-dimensional shaping apparatus according to the present embodiment.

Subsequently, the metal powder M is discharged onto the table 41 from the discharge part 31b of the powder storage part 31. Then, the metal powder M on the table 41 is leveled by the leveling part 32 in such a way that the surface thereof is horizontal. Subsequently, the energy beam irradiation part 2 illustrated in FIG. 1 emits the energy beam EB to sinter the metal powder M, thereby forming a part of a shaped article M', as illustrated in FIG. 7.

Figure 8:
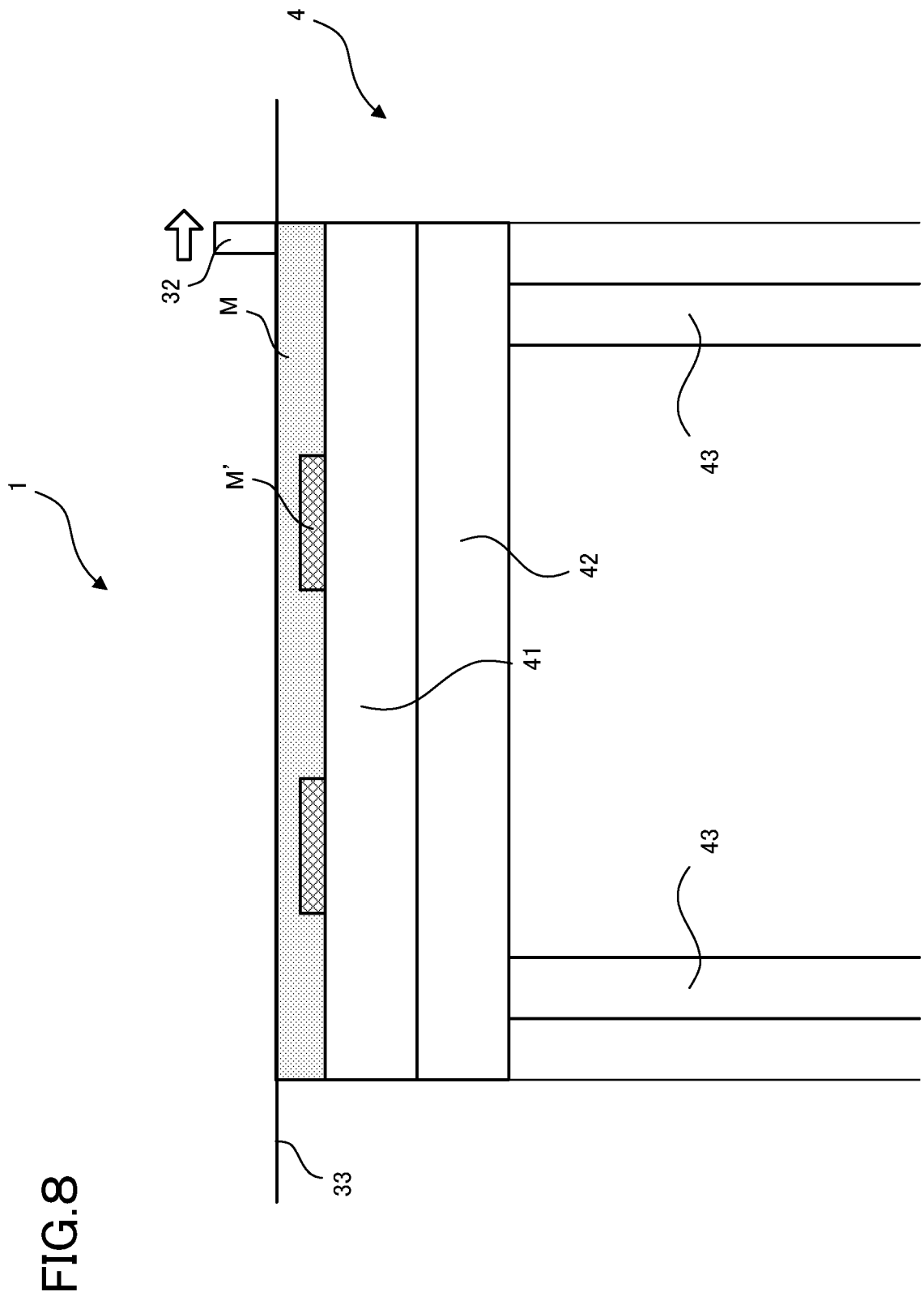
FIG. 8 is an enlarged view illustrating an operation of the shaped article placing part of the three-dimensional shaping apparatus according to the present embodiment.

Then, the drive part 45 illustrated in FIG. 4 is driven again to move downward the table 41, as illustrated in FIG. 8. The moving amount of the table 41 is previously input to the input part 51 illustrated in FIG. 5 and then stored in the storage part 52.

Then, in the same way as above, in the three-dimensional shaping apparatus 1 according to the present embodiment, while the table 41 is moved by the moving amount stored in the storage part 52, the current, rotation speed and torque signals of the respective first to fourth drive parts 45a to 45d are input to the controller 50.

The controller 50 independently controls the first to fourth drive parts 45a to 45d on the basis of the above signals to thereby control the table 41 to a predetermined posture. In the present embodiment, the table 41 is made horizontal.

Figure 9:
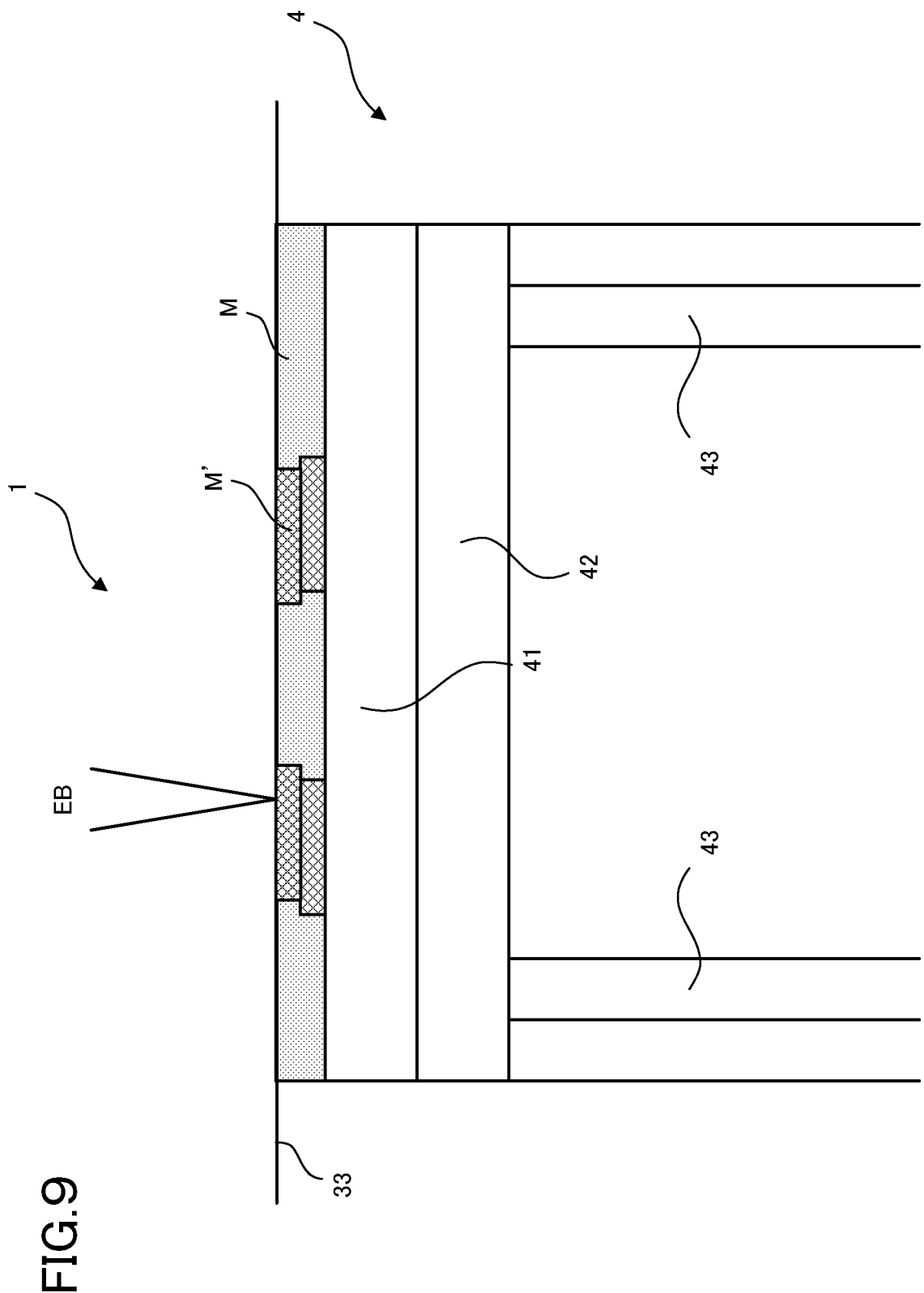
FIG. 9 is an enlarged view illustrating an operation of the shaped article placing part of the three-dimensional shaping apparatus according to the present embodiment.

Subsequently, the metal powder M is discharged onto the table 41 from the discharge part 31b of the powder storage part 31. Then, the metal powder M on the table 41 is leveled by the leveling part 32 in such a way that the surface thereof is horizontal. Subsequently, the energy beam irradiation part 2 illustrated in FIG. 1 emits the energy beam EB to sinter the metal powder M, thereby forming a part of a shaped article M', as illustrated in FIG. 9.

Figure 10:
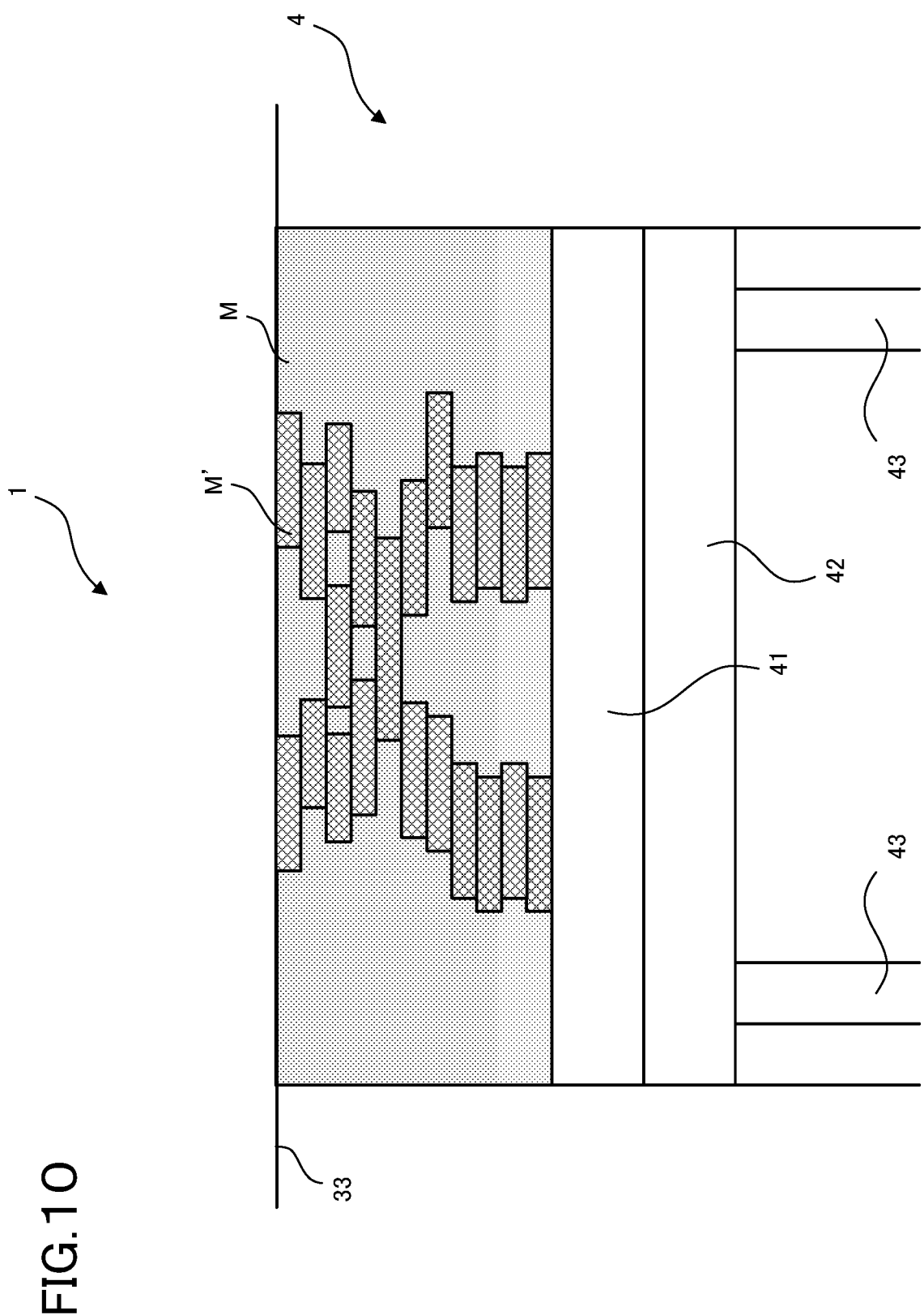
FIG. 10 is a view illustrating a state where a shaped article is formed by the three-dimensional shaping apparatus according to the present embodiment.

FIG. 10 is a view illustrating a state where a shaped article is formed by the three-dimensional shaping apparatus according to the present embodiment.

By operating the three-dimensional shaping apparatus according to the present embodiment as illustrated in FIGS. 6 to 9, the shaped article M' is formed as illustrated in FIG. 10.

The first to fourth drive parts 45a to 45d are provided independently of one another as described above, so that the posture of the table 41 can be set in various patterns, enabling shaped articles M' of various types to be formed.

Further, it is possible to control the table 41 to a predetermined posture by independently controlling the first to fourth drive parts 45a to 45d, so that shaped article M' of various types can be formed with high accuracy.

Furthermore, the controller 50 independently controls the first to fourth drive parts 45a to 45d to thereby make the table 41 horizontal, thus enabling the shaped article M' to be formed with high accuracy.

Figure 11:
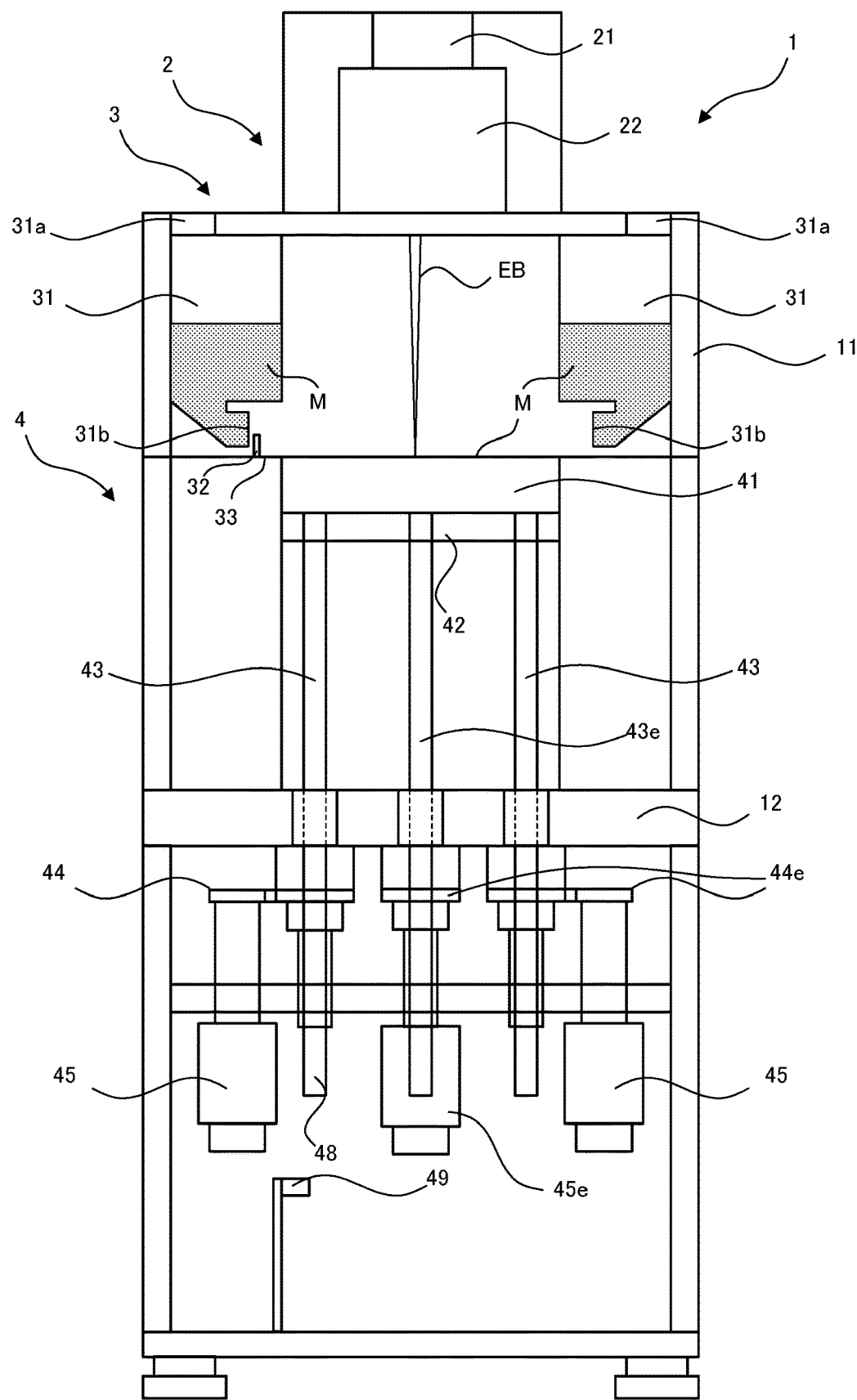
FIG. 11 is a view illustrating a three-dimensional shaping apparatus according to another embodiment of the present invention.
Figure 12:
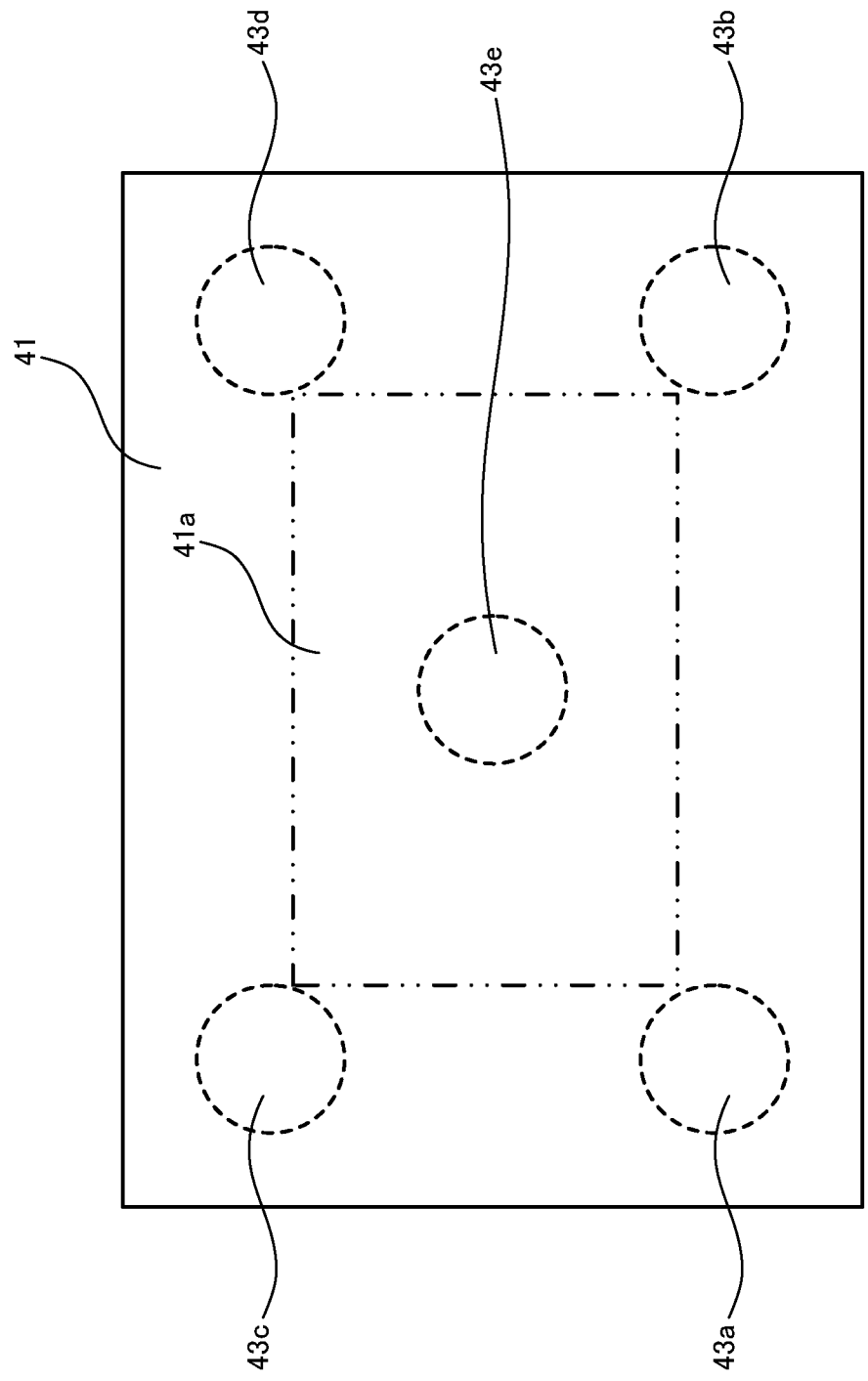
FIG. 12 is a schematic view illustrating an arrangement in the drive transmission part of the three-dimensional shaping apparatus according to the another embodiment.

FIG. 11 is a view illustrating a three-dimensional shaping apparatus according to another embodiment of the present invention. FIG. 12 is a schematic view illustrating an arrangement in the drive transmission part of the three-dimensional shaping apparatus according to the another embodiment.

In the another embodiment of the three-dimensional shaping apparatus 1 illustrated in FIGS. 11 and 12, a fifth drive part 45e, a fifth deceleration part 44e, and a fifth ball screw 43e are provided below the center portion of the table 41. The five drive parts 45 are preferably controlled independently of one another.

By thus supporting the table 41 at the five positions and driving the table 41 using the five drive parts 45, the shaped article M' can be formed with higher accuracy while securing horizontal accuracy of the table 41. Further, a large-sized shaped article having heavy weight and large area can be placed.

Figure 13:
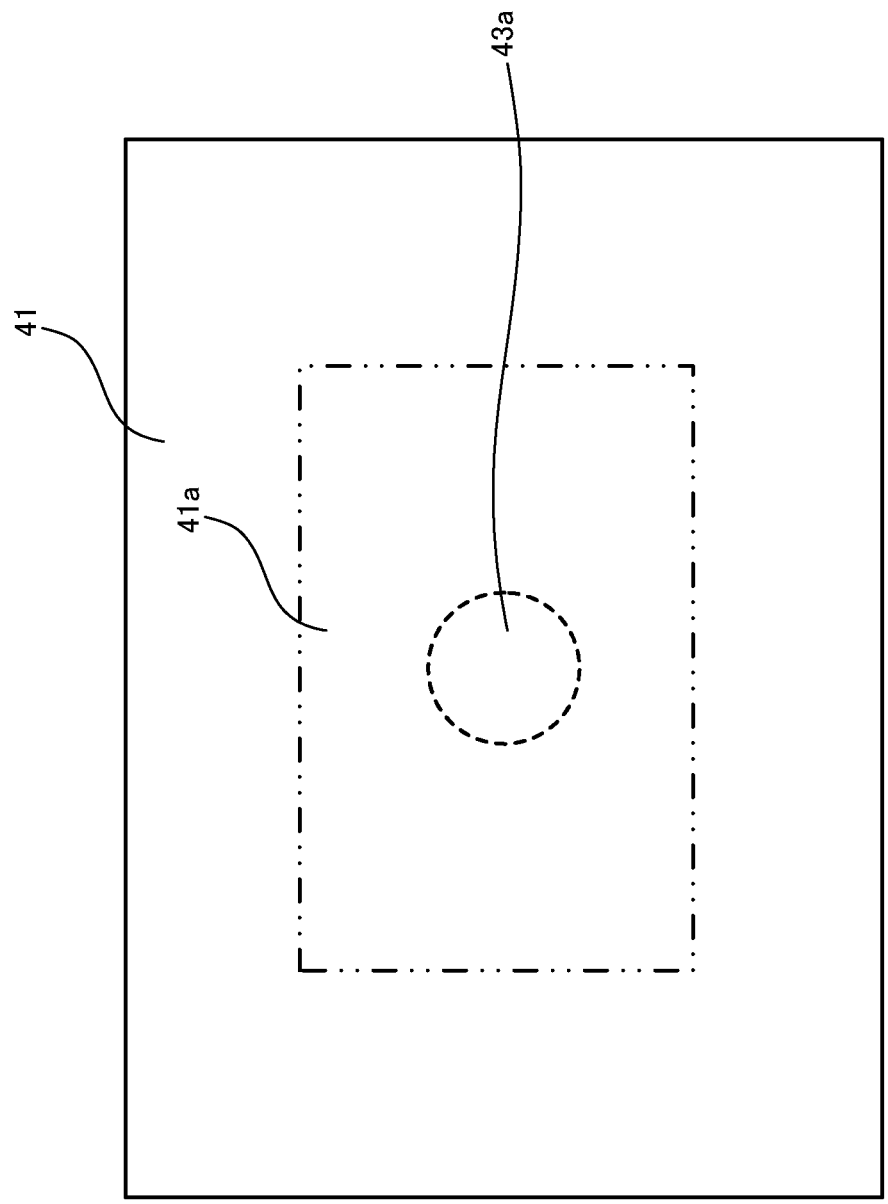
FIG. 13 is a schematic view illustrating an arrangement in the drive transmission part of a three-dimensional shaping apparatus according to a still another embodiment.

FIG. 13 is a schematic view illustrating an arrangement in the drive transmission part of a three-dimensional shaping apparatus according to a still another embodiment.

In the still another embodiment of the three-dimensional shaping apparatus 1 illustrated in FIG. 13, only a first ball screw 43*a* is provided. In this case, unillustrated only one drive part 45 is preferably controlled.

By thus supporting the table 41 at the single position and driving the table 41 using the unillustrated single drive part 45, the number of the ball screws 43, deceleration parts 44, and drive parts 45 can be reduced, whereby the shaped article M' can be formed at low cost.

Preferably, the first ball screw 43*a* that supports the table 41 is disposed at the centroid position of the table 41 so as to stabilize the posture of the table 41.

Figure 14:
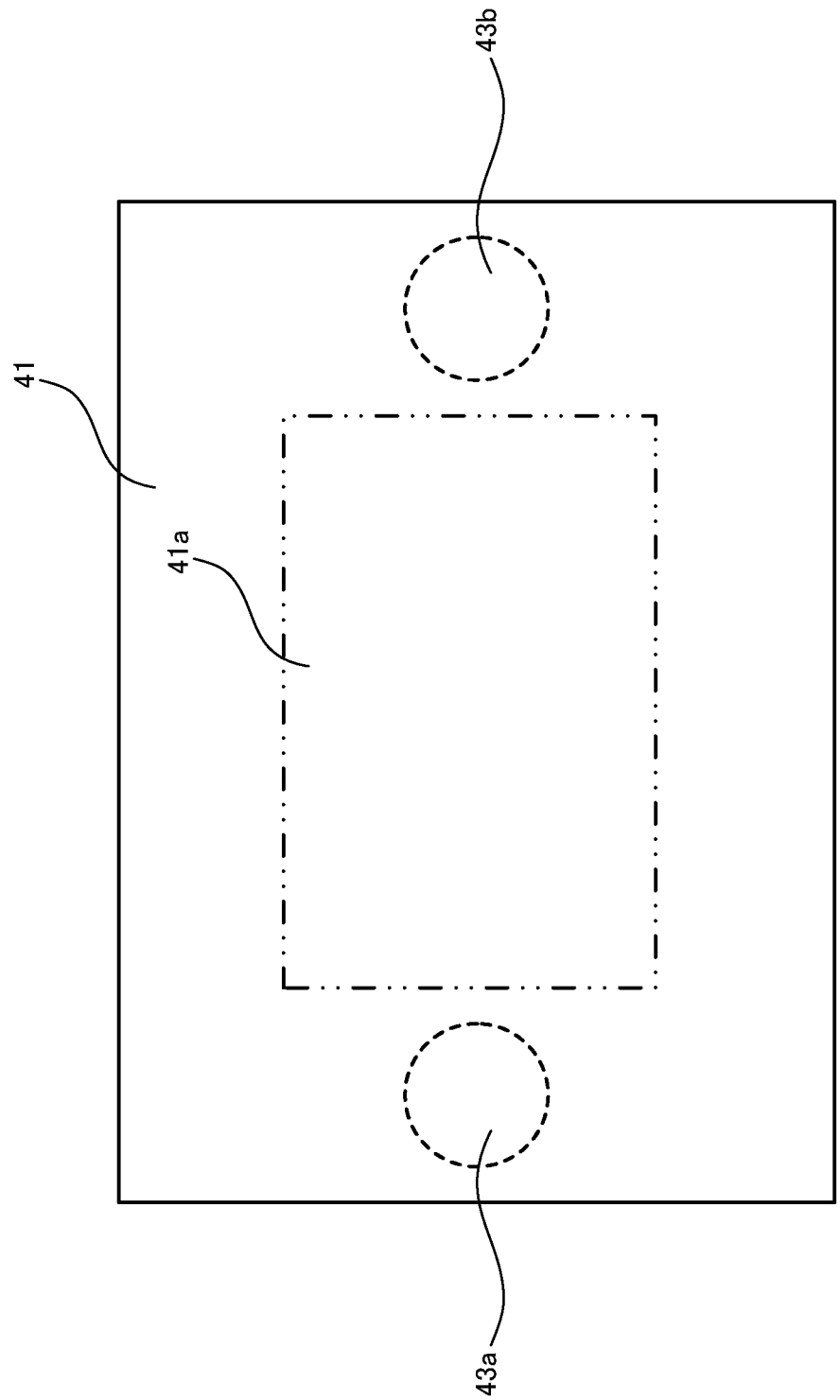
FIG. 14 is a schematic view illustrating an arrangement in the drive transmission part of a three-dimensional shaping apparatus according to a still another embodiment.

FIG. 14 is a schematic view illustrating an arrangement in the drive transmission part of a three-dimensional shaping apparatus according to a still another embodiment.

In the still another embodiment of the three-dimensional shaping apparatus 1 illustrated in FIG. 14, at least two first and second ball screws 43*a* and 43*b* are provided. In this case, unillustrated two drive parts 45 are preferably controlled independently.

By thus supporting the table 41 at the two positions and driving the table 41 using the unillustrated two drive parts 45, the number of the ball screws 43, deceleration parts 44, and drive parts 45 can be reduced, whereby the shaped article M' can be formed at low cost.

Preferably, the first and second ball screws 43*a* and 43*b* that support the table 41 are disposed in such a way that a line connecting the first and second ball screws 43*a* and 43*b* includes the centroid of the table 41 so as to stabilize the posture of the table 41.

Figure 15:
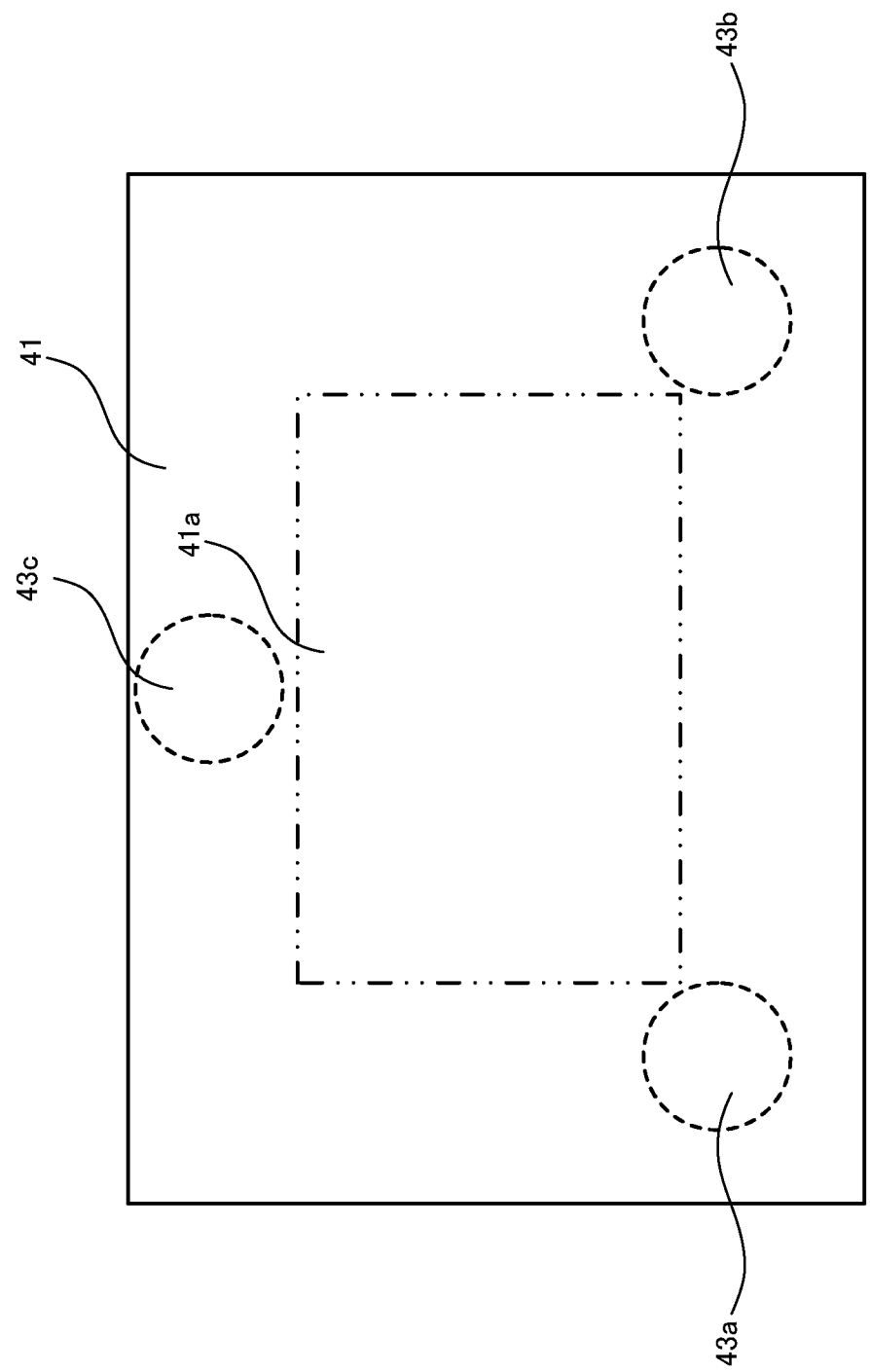
FIG. 15 is a schematic view illustrating an arrangement in the drive transmission part of a three-dimensional shaping apparatus according to a still another embodiment.

FIG. 15 is a schematic view illustrating an arrangement in the drive transmission part of a three-dimensional shaping apparatus according to a still another embodiment.

In the still another embodiment of the three-dimensional shaping apparatus 1 illustrated in FIG. 15, three first to third ball screws 43*a* to 43*c* are disposed in a triangle. In this case, unillustrated three drive parts 45 are controlled preferably independently.

By thus supporting the table 41 at the three positions and driving the table 41 using the unillustrated three drive parts 45, a plane is defined to stabilize the posture of the table 41. In addition, the number of the ball screws 43, deceleration parts 44, and drive parts 45 can be reduced, whereby the shaped article M' can be formed at low cost.

Preferably, the first to third ball screws 43*a* to 43*c* that support the table 41 are disposed in such a way that the triangle formed by the first to third ball screws 43*a* to 43*c* includes the centroid of the table 41 so as to stabilize the posture of the table 41.

Figure 16:
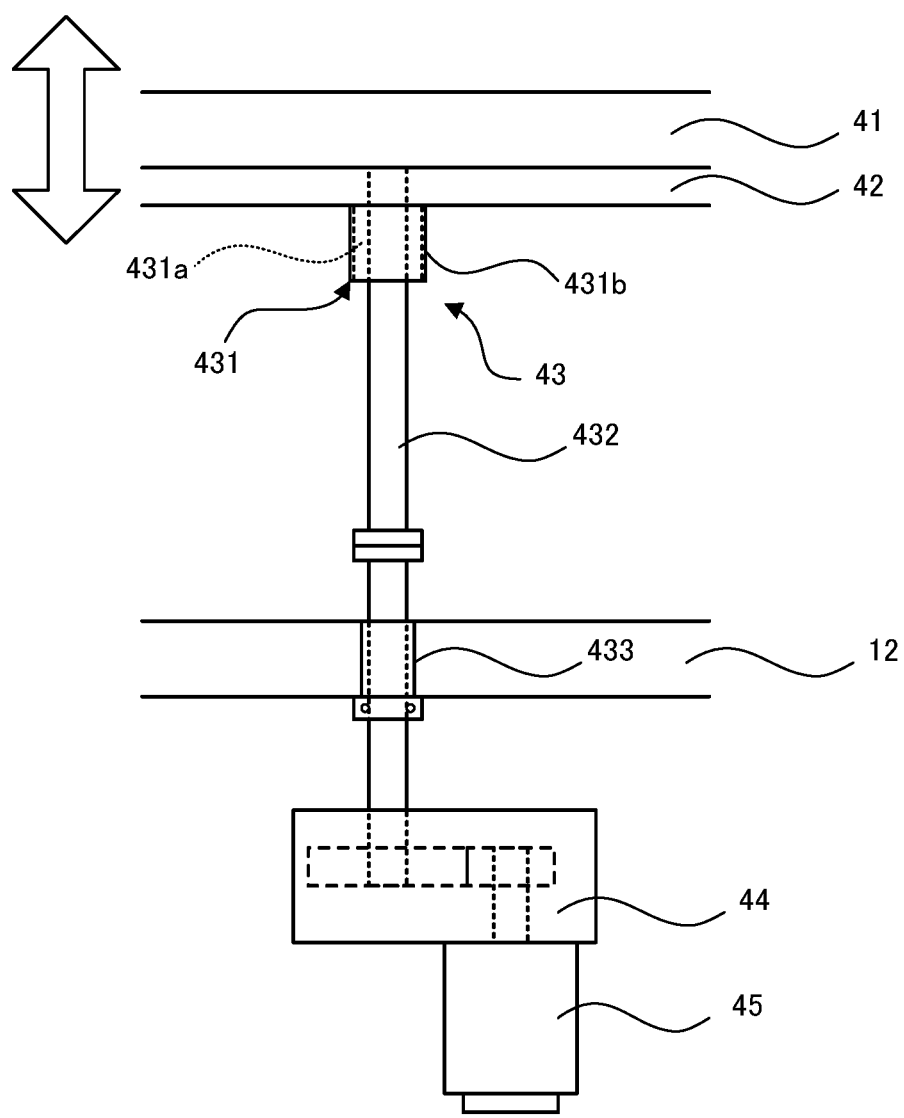
FIG. 16 is a schematic view illustrating a structure of the drive transmission part of the three-dimensional shaping apparatus according to the present embodiment.

FIG. 16 is a schematic view illustrating a structure of the drive transmission part of the three-dimensional shaping apparatus according to the present embodiment.

In the present embodiment illustrated in FIG. 16, a screw part 432 of the ball screw 43 is rotated by the drive force of the drive part 45 to vertically move a nut part 431, thereby vertically moving the table 41 through the slider 42. The nut part 431 and the table 41 may directly be connected to each other.

The nut part 431 is constituted of a nut 431*a* and a case 431*b* surrounding the nut 431*a*. The case 431*b* is fixed to the slider 42. The nut 431*a* can be rotated with respect to the case 431*b*. The screw part 432 is rotatably fixed to the slider 42 at its upper portion, screwed to the nut 431*a* immediately below the slider 42, and connected, through a coupling, to the deceleration part 44 at its lower portion. The screw part 432 penetrates a spline nut 433 fixed to the reference frame 12.

A drive force generated from the drive part 45 rotates the screw part 432 through the deceleration part 44. The rotation of the screw part 432 rotates the nut 431*a* of the nut part 431. The nut part 431 can be vertically moved along the screw part 432, so that when the nut 431*a* is rotated, the slider 42 is vertically moved to thereby vertically move the table 41.

Figure 17:
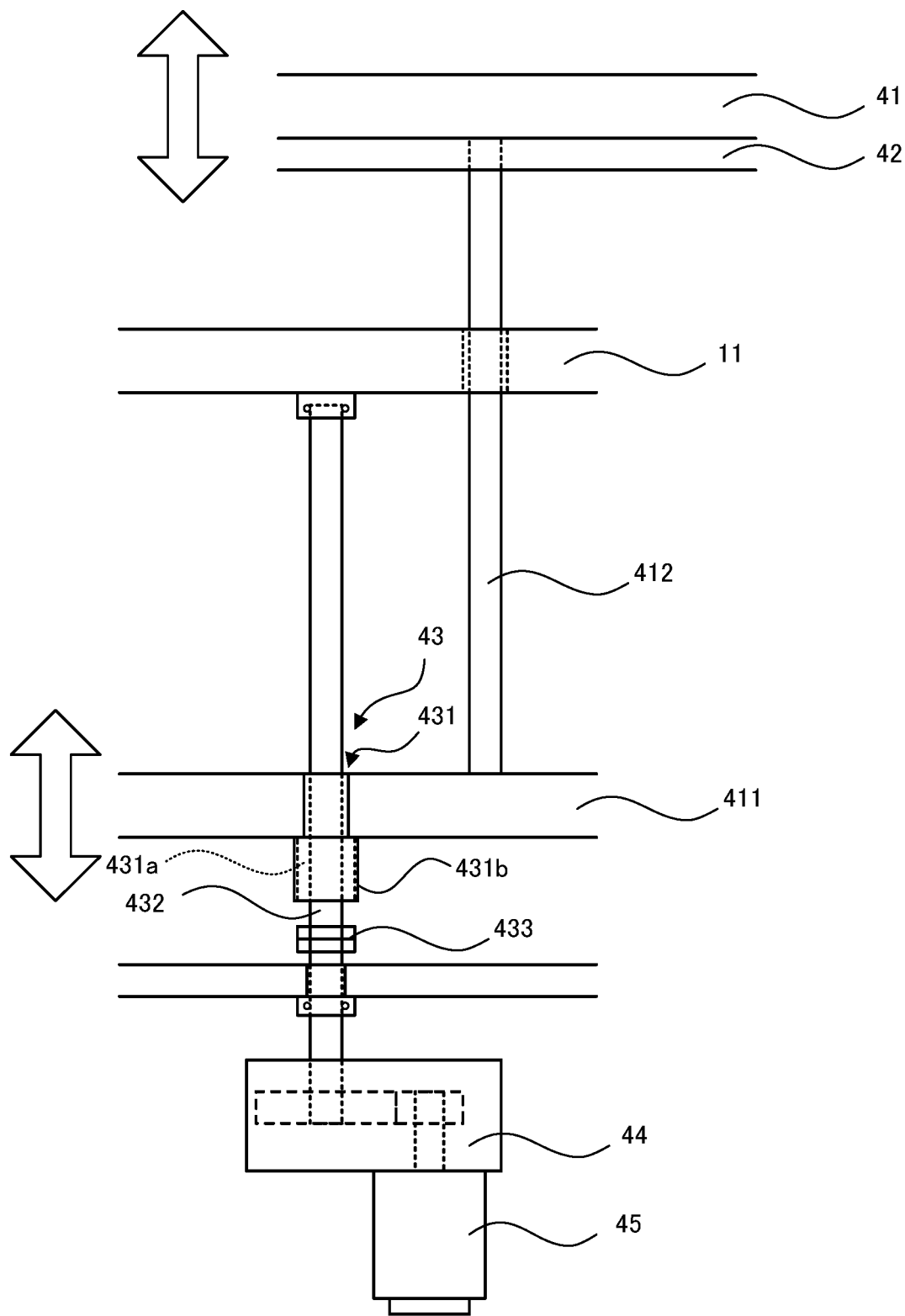
FIG. 17 is a schematic view illustrating a structure of the drive transmission part of a three-dimensional shaping apparatus according to another embodiment.

FIG. 17 is a schematic view illustrating a structure of the drive transmission part of a three-dimensional shaping apparatus according to another embodiment.

In the another embodiment illustrated in FIG. 17, the screw part 432 of the ball screw 43 is rotated by the drive force of the drive part 45 to vertically move the nut part 431, thereby vertically moving a movable frame 411, which vertically moves the table 41 through a rod 412 and the slider 42. The rod 412 and the table 41 may directly be connected to each other.

The nut part 431 is constituted of the nut 431*a* and the case 431*b* surrounding the nut 431*a*. The case 431*b* is integrally fixed to the movable frame 411. The screw part 432 is fixed to the support frame 11 at its upper portion, penetrates the movable frame 411, screwed to the nut 431*a* immediately below the movable frame 411, and connected, through a coupling, to the deceleration part 44 at its lower portion.

A drive force generated from the drive part 45 rotates the screw part 432 through the deceleration part 44. The rotation of the screw part 432 rotates the nut 431*a* of the nut part 431. The nut part 431 can be vertically moved along the screw part 432, so that when the nut 431*a* is rotated, the slider 42 is vertically moved through the movable frame 411 and rod 412 to thereby vertically move the table 41.

Figure 18:
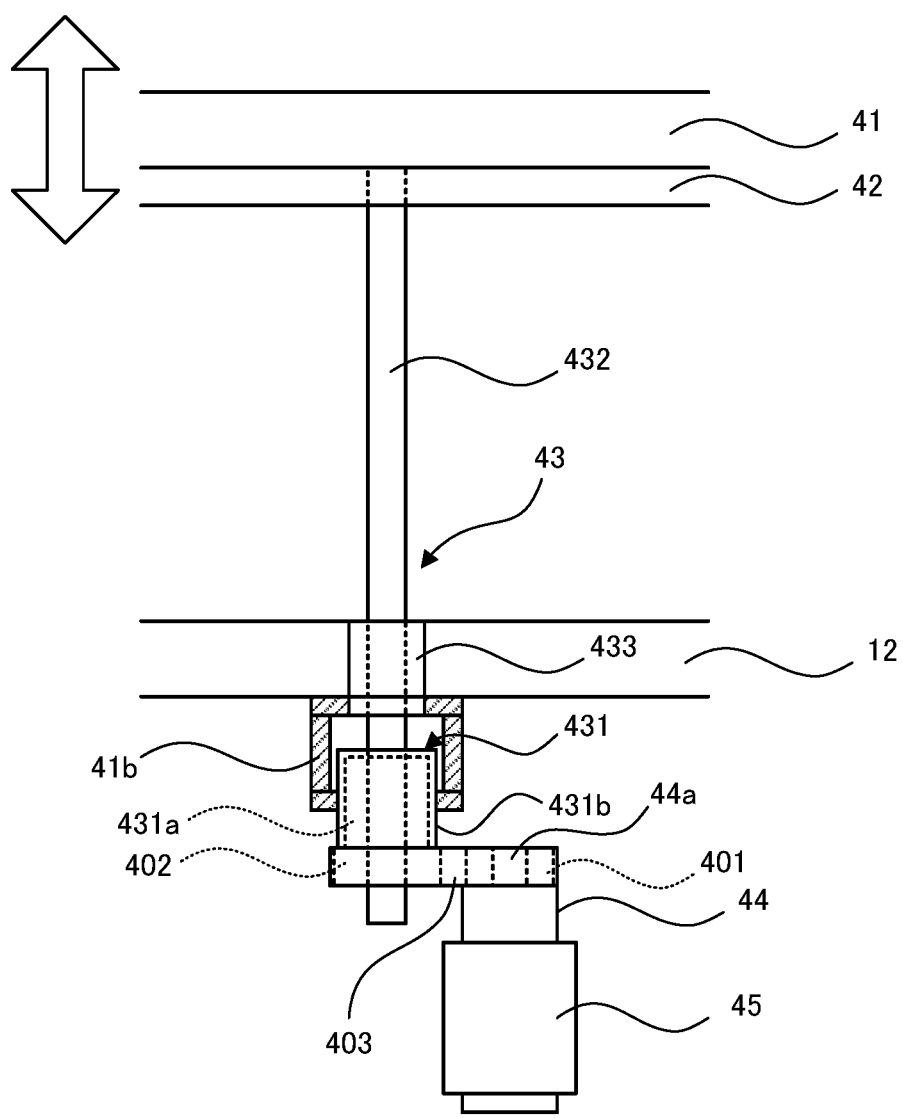
FIG. 18 is a schematic view illustrating a structure of the drive transmission part of a three-dimensional shaping apparatus according to still another embodiment.

FIG. 18 is a schematic view illustrating a structure of the drive transmission part of a three-dimensional shaping apparatus according to still another embodiment.

In the still another embodiment illustrated in FIG. 18, the nut 431*a* of the nut part 431 is rotated by the drive force of the drive part 45 to vertically move the screw part 432 of the ball screw 43, thereby vertically moving the table 41 through the slider 42. The screw part 432 and the table 41 may directly be connected to each other.

The nut part 431 is constituted of the nut 431*a* and the case 431*b* surrounding the nut 431*a*. The case 431*b* is fixed to a nut support part 41*b* fixed to the reference frame 12. Thus, the nut part 431 cannot be vertically moved. The nut 431*a* can be rotated with respect to the case 431*b*. The screw part 432 is rotatably fixed to the table 41 at its upper portion and screwed to the nut 431*a* at its lower portion. The screw part 432 penetrates the spline nut 433 fixed to the reference frame 12.

A first pulley 401 is fixed to an output shaft 44*a* of the deceleration part 44. A second pulley 402 is fixed to the nut 431*a*. The first pulley 401 and the second pulley 402 are connected to each other by a connection belt 403. The second pulley 402 is rotated together with the nut 431*a* of the nut part 431 to allow the screw part 432 to penetrate therethrough.

A drive force generated from the drive part 45 is output to the first pulley 401 through the output shaft 44*a* of the deceleration part 44. When the first pulley 401 is rotated, the second pulley 402 is rotated through the connection belt 403. The rotation of the second pulley 402 rotates the nut 431*a* of the nut part 431. The nut part 431 cannot be vertically moved, so that when the nut 431a is rotated, the screw part 432 is vertically moved. As a result, the table 41 is vertically moved.

Figure 19:
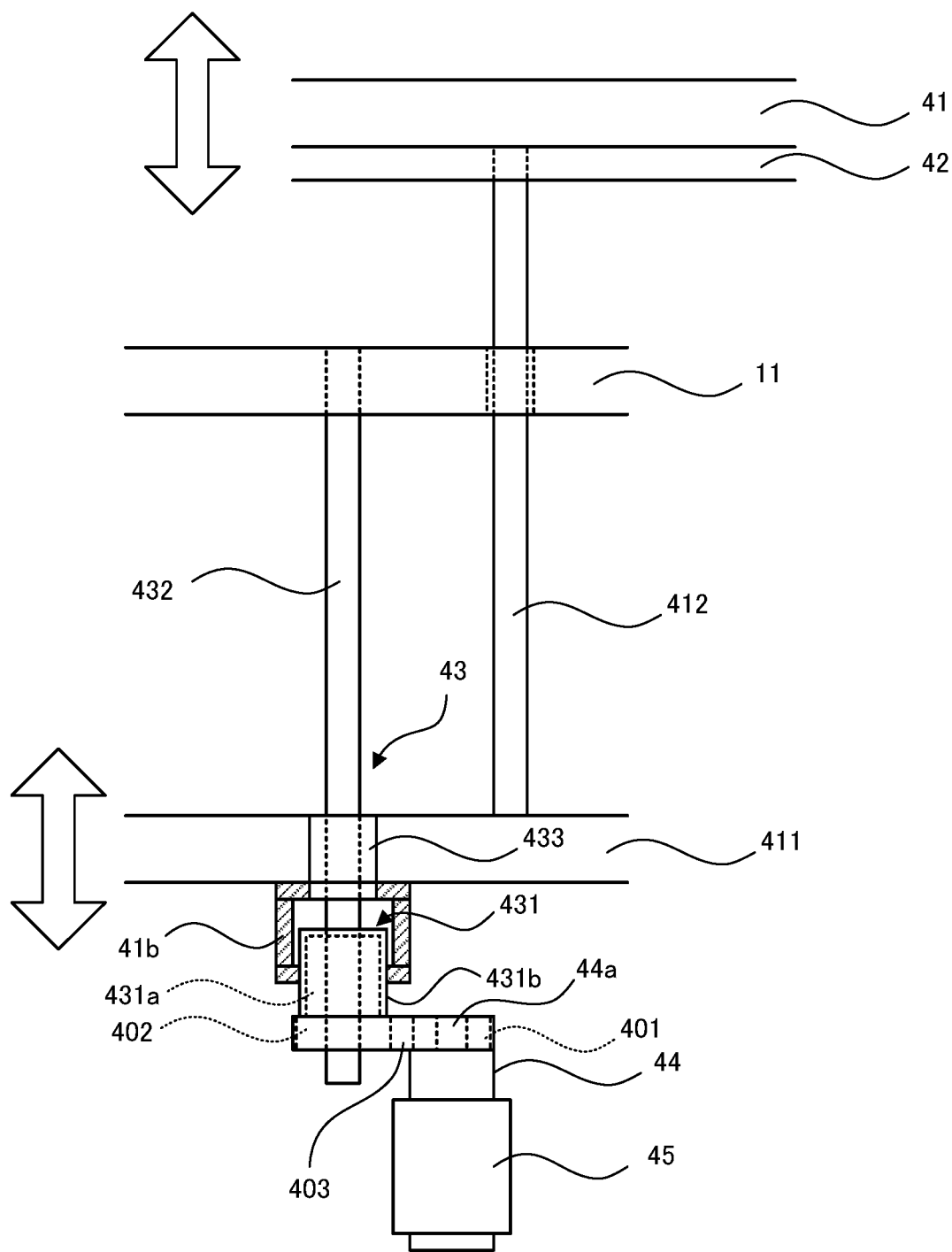
FIG. 19 is a schematic view illustrating a structure of the drive transmission part of a three-dimensional shaping apparatus according to still another embodiment.

FIG. 19 is a schematic view illustrating a structure of the drive transmission part of a three-dimensional shaping apparatus according to still another embodiment.

In the another embodiment illustrated in FIG. 19, the nut 431a of the nut part 431 is rotated by the drive force of the drive part 45 to vertically move the nut part 431 of the ball screw 43 with respect to the screw part 432, thereby vertically moving the movable frame 411, which vertically moves the table 41 through the rod 412 and slider 42. The rod 412 and the table 41 may directly be connected to each other.

The nut part 431 is constituted of the nut 431a and the case 431b surrounding the nut 431a. The case 431b is fixed to the nut support part 41b fixed to the movable frame 411, whereby the nut part 431 is integrally fixed to the movable frame 411. Further, the drive part 45 and the deceleration part 44 are also integrally fixed to the movable frame 411 and are thus vertically moved together with the movable frame 411.

The screw part 432 is fixed to the support frame 11 at its upper portion and screwed to the nut 431a at its lower portion. The screw part 432 penetrates the spline nut 433 fixed to the movable frame 411.

The first pulley 401 is fixed to the output shaft 44a of the deceleration part 44. The second pulley 402 is fixed to the nut 431a. The first pulley 401 and the second pulley 402 are connected to each other by the connection belt 403. The second pulley 402 is rotated together with the nut 431a of the nut part 431 to allow the screw part 432 to penetrate therethrough.

A drive force generated from the drive part 45 is output to the first pulley 401 through the output shaft 44a of the deceleration part 44. When the first pulley 401 is rotated, the second pulley 402 is rotated through the connection belt 403. The rotation of the second pulley 402 rotates the nut 431a of the nut part 431. The screw part 432 cannot be vertically moved, so that when the nut 431a is rotated, the nut 431a is vertically moved. Accordingly, the movable frame 411 is vertically moved together with the nut part 431, whereby the slider 42 and the table 41 connected to the movable frame 411 are vertically moved.

Figure 20:
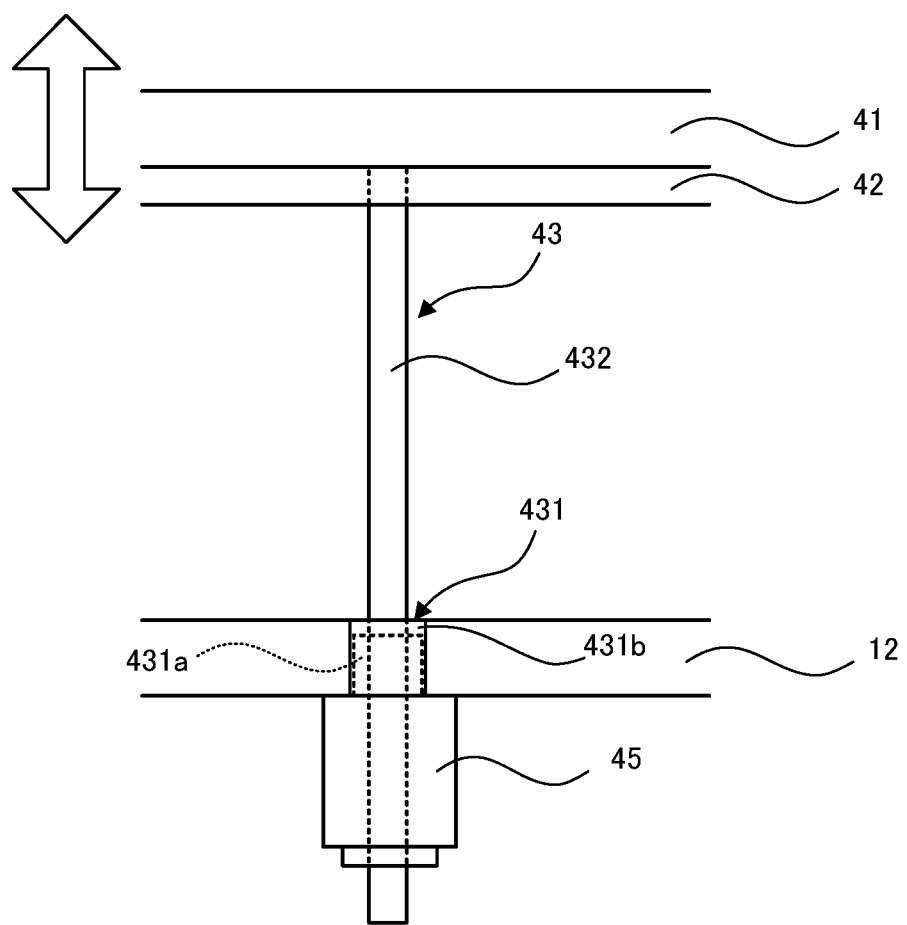
FIG. 20 is a schematic view illustrating a structure of the drive transmission part of a three-dimensional shaping apparatus according to still another embodiment.

FIG. 20 is a schematic view illustrating a structure of the drive transmission part of a three-dimensional shaping apparatus according to still another embodiment.

In the still another embodiment illustrated in FIG. 20, a hollow direct drive motor is used as the drive part 45 to rotate the nut 431a, thereby vertically moving the screw part 432 of the ball screw 43, which vertically moves the table 41 through the slider 42. The screw part 432 and the table 41 may directly be connected to each other.

The drive part 45 uses the hollow direct drive motor to drive the nut 431a to allow the screw part 432 to penetrate therethrough at the center thereof.

The nut part 431 includes the nut 431a inside thereof and is fixed to the reference frame 12 so as not to be vertically moved. The nut 431a can be rotated with respect to the case 431b. The screw part 432 is rotatably fixed to the table 41 at its upper portion and screwed to the nut 431a at its lower portion.

When the drive part 45 generates a drive force, the nut 431a of the nut part 431 is rotated. The nut part 431 cannot be vertically moved, so that when the nut 431a is rotated, the screw part 432 is vertically moved. As a result, the table 41 is vertically moved.

Figure 21:
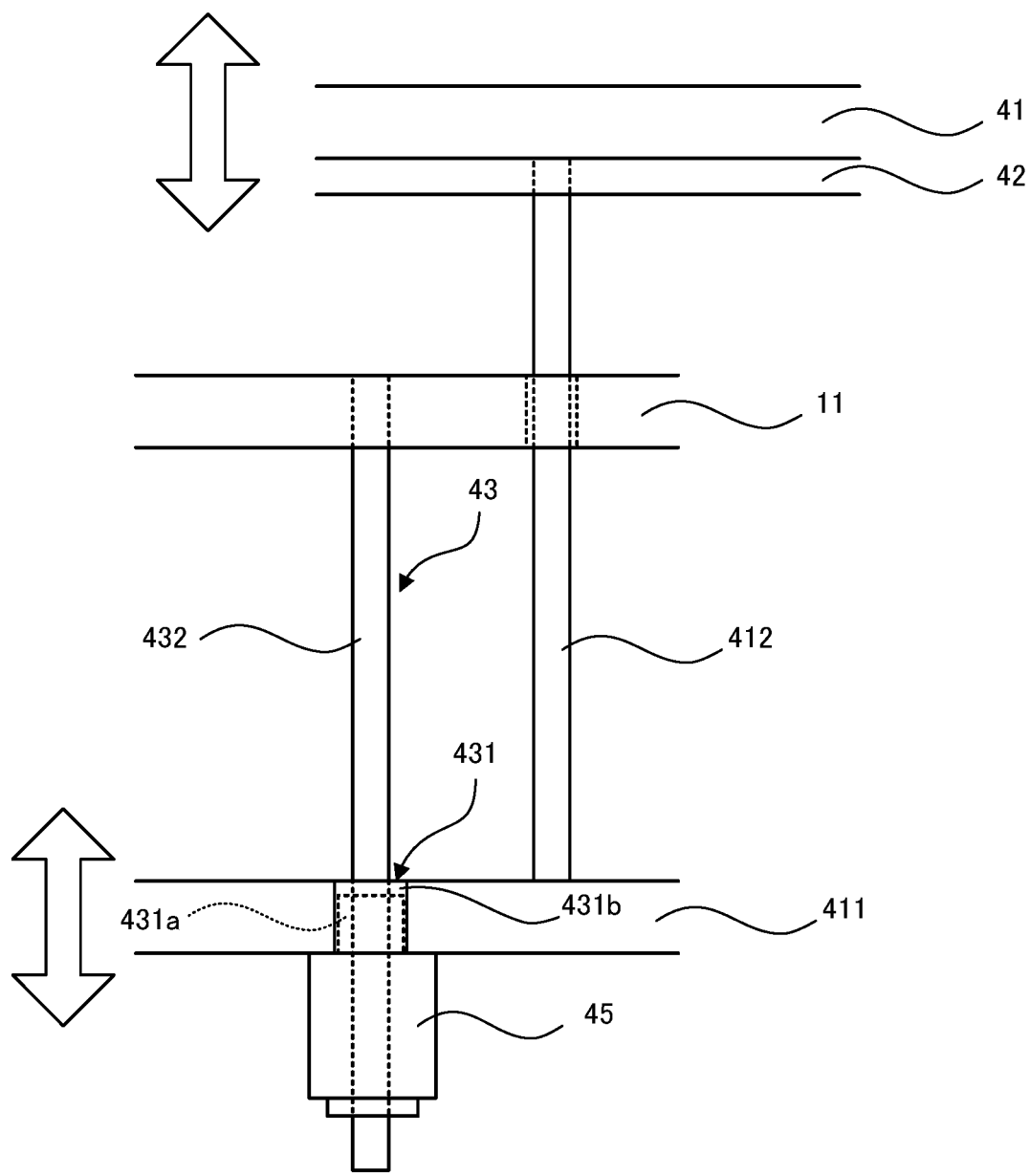
FIG. 21 is a schematic view illustrating a structure of the drive transmission part of a three-dimensional shaping apparatus according to still another embodiment.

FIG. 21 is a schematic view illustrating a structure of the drive transmission part of a three-dimensional shaping apparatus according to still another embodiment.

In the still another embodiment illustrated in FIG. 21, a hollow direct drive motor is used as the drive part 45 to rotate the nut 431a. This vertically moves the screw part 432 of the ball screw 43 to vertically move the movable frame 411, thereby vertically moving the table 411 through the rod 412 and slider 42. The rod 412 and the table 41 may directly be connected to each other.

The drive part 45 uses the hollow direct drive motor to drive the nut 431a to allow the screw part 432 to penetrate therethrough at the center thereof.

The nut part 431 is constituted of the nut 431a and the case 431b surrounding the nut 431a. The case 431b is fixed to the movable frame 411. The nut 431a can be rotated with respect to the case 431b. The screw part 432 is fixed to the frame 11 at its upper portion and screwed to the nut 431a at its lower portion.

When the drive part 45 generates a drive force, the nut 431a of the nut part 431 is rotated. The rotation of the nut 431a vertically moves the nut 431a along the screw part 432. Accordingly, the movable frame 411 is vertically moved together with the nut part 431, thereby vertically moving the slider 42 and table 41 connected to the movable frame 411 through the rod 412.

The same control system as that described in FIG. 5 may be used in all of the above embodiments related to the arrangements in the drive transmission part and the structure of the drive transmission part of the three-dimensional shaping apparatus 1.

The three-dimensional shaping apparatus 1 according to the present embodiment includes the support frame 11, the material supply part 3 supported by the support frame 11, the shaped article placing part 4 which is supported by the support frame 11 and on which a material supplied from the material supply part 3 is placed, the input part 51 that previously inputs thereto the moving amount of the table 41, the storage part 52 that stores the moving amount input thereto from the input part 51, and the controller 50 that controls the material supply part 3 and the shaped article placing part 4. The shaped article placing part 4 includes the table 41 on the upper surface of which a shaped article is placed and the drive part 45 that drives the table 41. The controller 50 moves the table 41 by the moving amount stored in the storage part 52. Thus, a three-dimensional shaping apparatus excellent in accuracy and productivity can be provided.

In the three-dimensional shaping apparatus 1 according to the present embodiment, the state signals of the drive part 45 are fed back to the controller 50, enabling more highly accurate control.

In the three-dimensional shaping apparatus 1 according to the present embodiment, the drive part 45 includes the first and second drive parts 45a and 45b which can be independently driven. The controller 50 independently controls the first and second drive parts 45a and 45b. Thus, a three-dimensional shaping apparatus excellent in accuracy and productivity can be provided.

In the three-dimensional shaping apparatus 1 according to the present embodiment, the shaped article placing part 4 further includes the transmission part 43 having the first and second ball screws 43a and 43b that transmit drive forces supplied from the respective first and second drive parts 45*a* and 45*b* to the table 41, thus enabling smooth movement of the table 41.

In the three-dimensional shaping apparatus 1 according to the present embodiment, the drive part 45 includes the first to fourth drive parts 45*a* to 45*d* arranged in a rectangular shape. The controller 50 can independently control the first to fourth drive parts 45*a* to 45*d*. Thus, more highly accurate control can be achieved.

The three-dimensional shaping apparatus 1 according to the present embodiment includes the rod 48 moved together with the table 41 and the limit switch 49 put in contact with the rod 48 when the rod 48 reaches a predetermined position, thus preventing the table 41 from being excessively moved.

The present invention is not limited to the above-described embodiments. That is, while the description of the embodiments includes specific and detailed contents for exemplification, variations or modifications may be applied to these detailed contents.

REFERENCE SIGNS LIST

1: Three-dimensional shaping apparatus
11: Support frame
12: Reference frame (support frame)
2: Energy beam irradiation part (material supply part)
21: Beam generation part
22: Beam scanning part
3: Powder supply part (material supply part)
31: Powder storage part
32: Leveling part
33: Outer frame part
4: Shaped article placing part
41: Table
42: Slider
43: Ball screw (transmission part)
44: Deceleration part (transmission part)
45: Drive part
48: Rod
49: Limit switch
50: Controller
51: Input part
52: Storage part

The invention claimed is:

1. A three-dimensional shaping apparatus characterized by comprising:
    a support frame;
    a powder material supply part supported by the support frame;
    a shaped article placing part which is supported by the support frame and on which a powder material supplied from the powder material supply part is placed;
    a motor encoder that previously inputs thereto a moving amount of one and only one table;
    a memory that stores the moving amount input thereto from the motor encoder;
    a controller that controls the powder material supply part and the shaped article placing part;
    a rod moved vertically together with the table, the rod being provided in a direction perpendicular to a surface of the table; and
    a limit switch put in contact with the rod when the rod reaches a predetermined position, wherein
    the shaped article placing part includes:
    the table on an upper surface of which a shaped article is placed; and
    a plurality of drive parts that drives the table, and
    the controller moves the table by the moving amount stored in the memory,
    wherein the table has a unitary structure driven by the plurality of drive parts,
    wherein each of the plurality of drive parts is independently driven,
    wherein the plurality of drive parts includes first and second drive parts which can be independently driven, and the controller independently controls the first and second drive parts,
    wherein the unitary structure has a planar upper surface extending over the plurality of drive parts, and
    wherein the limit switch is not in contact with the rod when the rod does not reach to the predetermined position.

2. The three-dimensional shaping apparatus according to claim 1, characterized in that state signals of the plurality of drive parts are fed back to the controller.

3. The three-dimensional shaping apparatus according to claim 1, characterized in that the shaped article placing part further includes a transmission part having first and second transmission parts that transmit drive forces supplied from the respective first and second drive parts to the table.

4. The three-dimensional shaping apparatus according to claim 3, characterized in that the plurality of drive parts includes the first drive part, the second drive part, a third drive part and a fourth drive part arranged in a rectangular shape, and
    the controller can independently control the first to fourth drive parts.

* * * * *